United States Patent
Tanaka et al.

(10) Patent No.: US 6,512,210 B2
(45) Date of Patent: Jan. 28, 2003

(54) CERAMIC HEATER

(75) Inventors: Satoshi Tanaka, Kokubu (JP); Eiji Kurahara, Kokubu (JP); Makoto Midou, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/753,190

(22) Filed: Jan. 2, 2001

(65) Prior Publication Data

US 2001/0042746 A1 Nov. 22, 2001

(30) Foreign Application Priority Data

Apr. 14, 2000 (JP) ........................ 2000-114313

(51) Int. Cl.$^7$ ................................................ H05B 3/08
(52) U.S. Cl. ...................................................... 219/541
(58) Field of Search ................................ 219/541, 542, 219/543, 544, 546, 547, 548, 552, 553; 338/307, 308, 309

(56) References Cited

U.S. PATENT DOCUMENTS

| | | | | |
|---|---|---|---|---|
| 4,146,957 A | * | 4/1979 | Toenshoff | 29/612 |
| 4,330,329 A | * | 5/1982 | Hayashi et al. | 420/511 |
| 4,512,871 A | * | 4/1985 | Kato et al. | 204/429 |
| 4,804,823 A | * | 2/1989 | Okuda et al. | 219/553 |
| 4,834,863 A | * | 5/1989 | Yamada et al. | 204/429 |
| 5,100,714 A | * | 3/1992 | Zsamboky | 428/137 |
| 5,753,893 A | * | 5/1998 | Noda et al. | 219/548 |
| 5,895,591 A | * | 4/1999 | Kojima et al. | 219/543 |
| 6,084,220 A | * | 7/2000 | Suematsu et al. | 219/544 |
| 6,121,590 A | * | 9/2000 | Kobayashi et al. | 219/553 |

FOREIGN PATENT DOCUMENTS

| JP | 05/034313 | 2/1993 |
|---|---|---|
| JP | 08/273813 | 10/1996 |

* cited by examiner

*Primary Examiner*—Sang Paik
(74) *Attorney, Agent, or Firm*—Hogan & Hartson, LLP

(57) ABSTRACT

A ceramic heater including a ceramic body and a heating element buried in the ceramic body under the surface of thereof is provided, wherein metal pads are disposed on the outside of the ceramic body and electrically connected to the heating element, outer leads are joined by a braze layer onto a metal plated layer covering each of the pads, and the braze layer contains an amount of 500 ppm or less by weight of palladium in a brazing metal material based on Au, Cu, or Ni. The plated layer may be formed on the surface of the metal pads which have been activated with an activating solution containing an amount of 90 ppm of less by weight of Pd, in order to reduce the Pd content as defined above in the braze layer, preventing the braze layer from being cracked and enhancing the useful life of the ceramic heater.

9 Claims, 9 Drawing Sheets

CERAMIC HEATER

BACKGROUND OF THE INVENTION

1. Field of the Invention

The present invention relates to a ceramic heater having a heating element buried within a ceramic body.

2. Prior Art

There is well known ceramic heaters including a ceramic body and a heating member buried within the ceramic body. Such ceramic heaters have been used as heaters for air/fuel ratio controllers, carburetors in the automobile industry, also brazing irons and others. The ceramic body is formed of, for example, alumina or aluminum nitride, taking the form of a cylinder or plate, and the heating member includes, for emitting heat, a heating element made of a high-temperature metal such as tungsten (W), molybdenum (Mo) or rhenium (Re) being buried within the ceramic body and disposed under the outer surface thereof.

The heating element is formed a thin, narrow film in a shape of waved or indented pattern, and both rear ends of the heating element is connected to inner leads which are connected to respective pads provided on the surface of the ceramic body.

For example, for fabricating a cylindrical ceramic heater, as shown in FIG. 17, a green sheet 3 containing a powdery ceramic material is provided with thin metal paste films including a high temperature metal to form a heating member 60 and 6 in a defined pattern on one side of thereof, and is wound on the peripheral surface of a ceramic core 2 or rod so that the paste films makes contact to the surface of the ceramic core 2, and then is fired to sinter the ceramic core 2, green sheet 3 and thin applied film together, the film is formed into a heating member buried under the sintered sheet 3, obtaining a ceramic heater as shown in FIG. 18.

On the green sheet, the paste film includes inner lead portions for connecting the heating resistor to a pair of respective pads, through via holes, which pads are printed on the other side of the green opposite form the paste film. Therefore, in the finally obtained ceramic heater, the pair of pads are provided on the outer surface of the ceramic heater and are connected to the heating resistor through the via holes and the inner lead portions.

Outer leads can usually be fixedly brazed to the respective pads for supplying electric power to the heating resister. The above mentioned blazing method has widely been adopted but as another connecting method it is possible to clamp outer lead parts to the pads.

For brazing the pads, previously plated on the pads is a metallic layer including nickel, chromium or the like, and is brazed with the above mentioned outer leads such as wires made of an Fe—Ni alloy or other thermally resistant alloy including Ni and/or Cr.

These ceramic heater have been used for heating sensors such as oxygen sensors for automobiles, in which case, a system is adopted for heating the sensors quickly to start the sensors at the operating temperatures for cold starting, and than the heaters are required to have a high resistance to heat shock, with high endurance against higher temperatures than 800° C. High heat emission to shorten the period of time of raising temperature often overrun a defined temperature when cold starting, then giving damage to the sensor electrodes and shortening their useful life time, or reducing endurance of the ceramic heaters.

Prior art discloses a heating member structure for preventing the overheating to speed down the increasing temperature at high temperatures. For example, Japanese Patent Publication No. 8-273813 discloses a ceramic heater wherein a heat pattern is formed in plate-like ceramic body made of Aluminum nitride, the heat pattern being composed of a heating resister, and a further conductive material having a higher temperature coefficient of a resistance than that of the heating resister, which material is connected to the heating resister in series.

Japanese Patent Publication No. 5-34313 discloses a ceramic heater comprising two heating resisters which have different temperature coefficient from each other.

However, it has often been observed that when the ceramic heaters are operated to raise the temperature quickly, for example, at a rate of raising the temperature from room temperature to about 900° C. in about 3 second, cracks occur at the surface of the ceramic bodies, sometime the ceramic heaters increasing in electrical resistance.

Further, the structure of brazing the outer leads to the plated metallic layer on the pads, as mentioned previously, have often reduced the brazing strength between the leads and ceramic body. After brazing, as depicted in FIGS. 4 and 5, cracks 91 or cavities have been observed to open in a meniscus of the brazing material layer 9 formed between the outer lead 10 and plated layer 11.

Another problem was to that, where the brazing material layer reached an peripheral edge of the pad on the ceramic, the pad was pealed from the outside of the ceramic heater due to tensile stress applied to the leads, resulting in electrical disconnection to the heating element.

Yet another problem was that the outer leads formed of a Fe—Ni alloy tend to increase in grain side during heating, in use, having cracks created in the vicinity of the brazing portion in virtue of metallic fatigue of the brazing material caused by mechanical vibration and/or repeatedly heating.

In the event that a heating element in the ceramic has any defect such as cracks in its segment, the ceramic heater would have a high risk of being superheated at the defect portion, allowing the heater resistance to be further increased so as to lower its useful life.

Further, the environments in which ceramic heaters have been used include circumstances containing high humidity at high temperatures wherein the ceramic heaters must have high endurance. For example, the ceramic heaters using for exhaust gas sensors are subjected to proof-water treatment to prevent the heaters from breaking by heat shock due to water or moisture inserted therein.

However, even in the case where water is prevented from invading directly in the case, actually, water dissolved in air is apt to penetrate into the case along with the ambient air.

Particularly, for Some ceramic heaters including braze layers of metal nickel or a Ni—Fe alloy which braze outer leads to the pads and plated layers made of nickel covering the braze layer, oxidative, corrosive elements such as chlorine somewhat remains on the nickel-containing structures.

The residual elements on the structures are changed to create compounds such as $NiCl_2$ or $Ni(OH)_2$ during using in the high-temperature, high-moisture circumstances. Such compounds are concentrated, while deposition and evaporation of water around the compounds are repeated, so as to corrode, through the pitting corrosion of the compounds, the faces of the Ni-based leads and interfaces between the outer lead and the braze layer, or between the braze layer and the Ni-based second plated layer. The corrosion, when further advancing, finally breaks the conductivity of the outer leads to the heating element for power supply.

SUMMARY OF THE INVENTION

An object of the present invention is to provide a ceramic heater having a sufficient strength between the outer leads and the pads or the ceramic body.

Another object of the present invention is to provide a ceramic heater having a high thermal-shock resistance when quickly heating to a high temperature.

Another object of the present invention is to provide a ceramic heater being capable of preventing corrosion of the pads and outer leads which have been experience in use.

In the present invention a ceramic heater includes a ceramic body, a heating member buried in the ceramic body and pads disposed on the outside of the ceramic body and electrically connected to the heating member, wherein an outer lead is joined by a braze layer onto a metal plated layer covering each of the pads, and the braze layer contains an amount of 500 ppm or less by weight of palladium.

In the ceramic heater of the present invention, the plated layer is formed on the surface of the metal pads which have been activated with an activating solution containing an amount of 90 ppm or less by weight of Palladium. As a result, the braze layer can not have any cavity in the braze layer.

The braze layer may comprise a metal or an alloy based on gold, copper, or nickel. Any edge of the braze layer secured within an area of and on the pad may be in a minimum distance D of 0.2 mm or more inside from the adjacent edge of the pad to prevent the pad from pealing from the ceramic body when the tensile force acts to the leads against to the ceramic body.

In the ceramic heater of the invention, via holes are each formed in the ceramic body to connect the heating member to the respective pads, and any edges of the braze layers secured on the pads is each in a minimum distance of 0.2 mm or more apart from the respective via holes, to maintain the strength of the leads with respect to the ceramic body.

Further, the outer leads may be formed of nickel or an alloy thereof, and preferably may have a mean crystal grain size of 400 $\mu$m or less to maintain the strength of the leads when the tensile force acts to the leads.

In the ceramic heater of the present invention, the heating member includes a heating element containing a plurality of segments disposed in series made of tungsten, molybdenum, or rhenium or an alloy thereof, and any of the segments of the heating element has a notch of a width G of ½ or less of the width F of the segment adjacent the notch to prevent the segment from overheat, without breaking the heating element.

The ceramic heater of the invention may be one which is sintered of a ceramic core, a ceramic sheet surrounded integrally onto the round ceramic core, and a heating member disposed integrally between the round ceramic core and the ceramic sheet. Further, the heating element contains a plurality of segments disposed in series to make a pattern made of tungsten, molybdenum, or rhenium or an alloy thereof, and an electric resistance per unit length of the segment at a central portion of the heating element is in a range of 75% to 90% of that of a segment at the peripheral portion thereof.

In the ceramic heater, the heating member may have a heating element encircled around the core, an angle of both edges of the heating element viewing from a center of the core is 90° or less.

Further, the pattern of the heating element preferably may have a length in a range of 2.5 to 10.0 mm longitudinally along the ceramic core.

Particularly, a width of the segment at the central portion of the heating element may be in a range of 20% to 90% of that at the peripheral portion of the heating element.

In the ceramic heater of the present invention, a braking element having a higher temperature coefficient of electric resistance than that of the resistance of the segment is connected to the heating member in series, a resistance ratio of the heating member to the braking element is in a range of 1.5 to 10.0, and a length of the braking element is 20 mm or less. In this case, an end of the braking element is connected to pads via inner leads and a distance of the end of the braking element to the pad is 20 mm or more.

A ceramic heater of the present invention include a ceramic body, a heating member buried in the ceramic body and metal pads disposed on the outside of the ceramic body and electrically connected to the heating member, wherein an outer lead is joined by a braze layer onto a metal plated layer covering each of the pads, and a mount of chlorine absorbed on surfaces of the outer leads and the braze layer is 2000 counts or less by measuring in EPMA analysis. It is preferable that the outer leads and the braze layers have previously been heat treated at a temperature of 500° C. or more in a reducing atmosphere to facilitate outgassing of chlorine from the metal surface such as braze layer. As a result, the outer leads and/or the braze layer readily can be formed of a nickel or an alloy hereof.

BRIEF DESCRIPTION OF THE DRAWINGS

The present invention is will be explained in further detail with reference to the accompanying drawings, in which.

DETAILED DESCRIPTION OF THE PREFERRED EMBODIMENTS

An embodiment of the invention shows a cylindrical ceramic heater including a ceramic body, a heating member buried in the ceramic body, and a pair of pads on the outside of the ceramic body, for electric supply, which pads are electrically connected to the heating member.

The heating member includes a heating element for emitting heat and a pair of inner leads connecting the heating element to the pads.

The pair of pads are attached on an outer surface of the ceramic body and are connected via the inner leads to the heating member buried in the ceramic body.

The ceramic body may be formed of electrically insulating, thermally conductive, heat-resistant material such as aluminum oxide, aluminum nitride or other ceramics. The heating member may be formed of high melting point metal, during sintering, from a paste containing a high temperature metal such as tungsten, molybdenum or rhenium.

Figure 17:
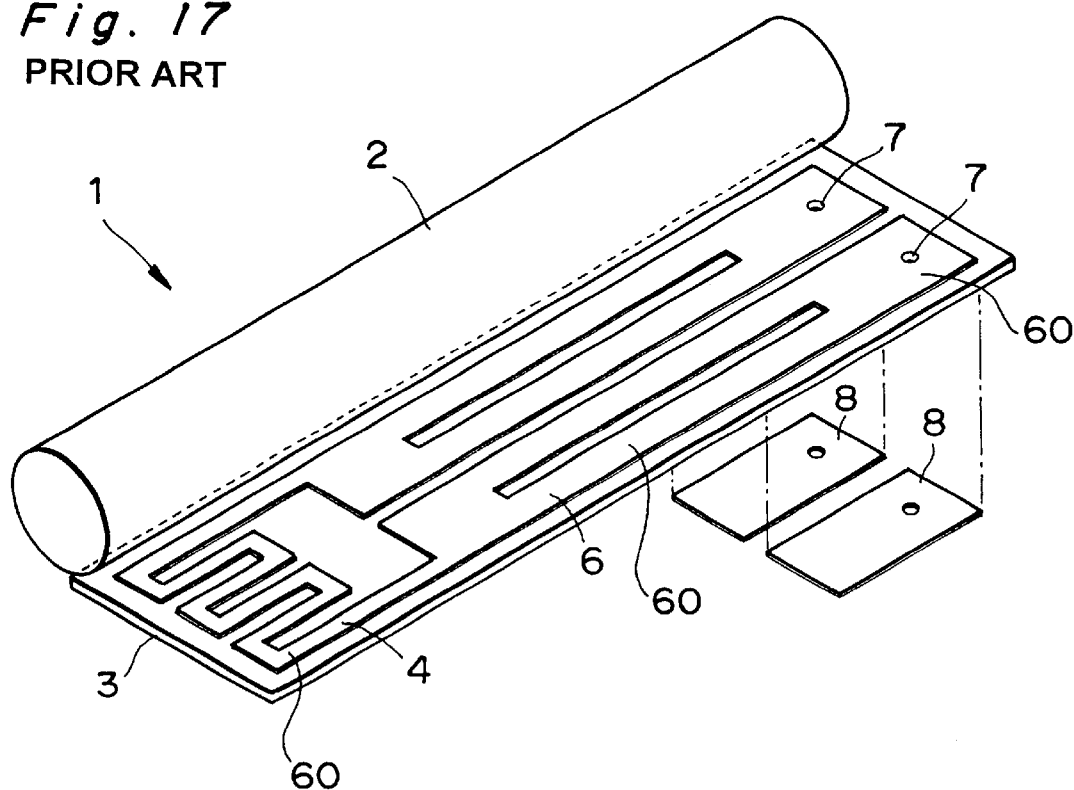
FIG. 17 shows a shows a perspective view of a cylindrical ceramic heater as fabricating in prior art, with a ceramic core and a developed ceramic green sheet having a heating member printed thereon.

FIG. 17 shows a developed view of a ceramic green sheet 3 and a ceramic core 3, such as a ceramic rod, to form a cylindrical ceramic heater 1, wherein on one side of the green sheet is printed, with a conductive paste, a heating member 60 including a heating element 4 having a desired pattern and a pair of inner leads 6 parallel to each other, one end of each inner lead being connected to each of both ends of the heating element 4.

On the opposite side of the green sheet 3 are provided a pair of pads 8 at a location corresponding to the ends of the inner leads 6 and via holes 7 through the pads 8 and the sheet 3, to reach the end of the inner leads 6.

Figure 15:
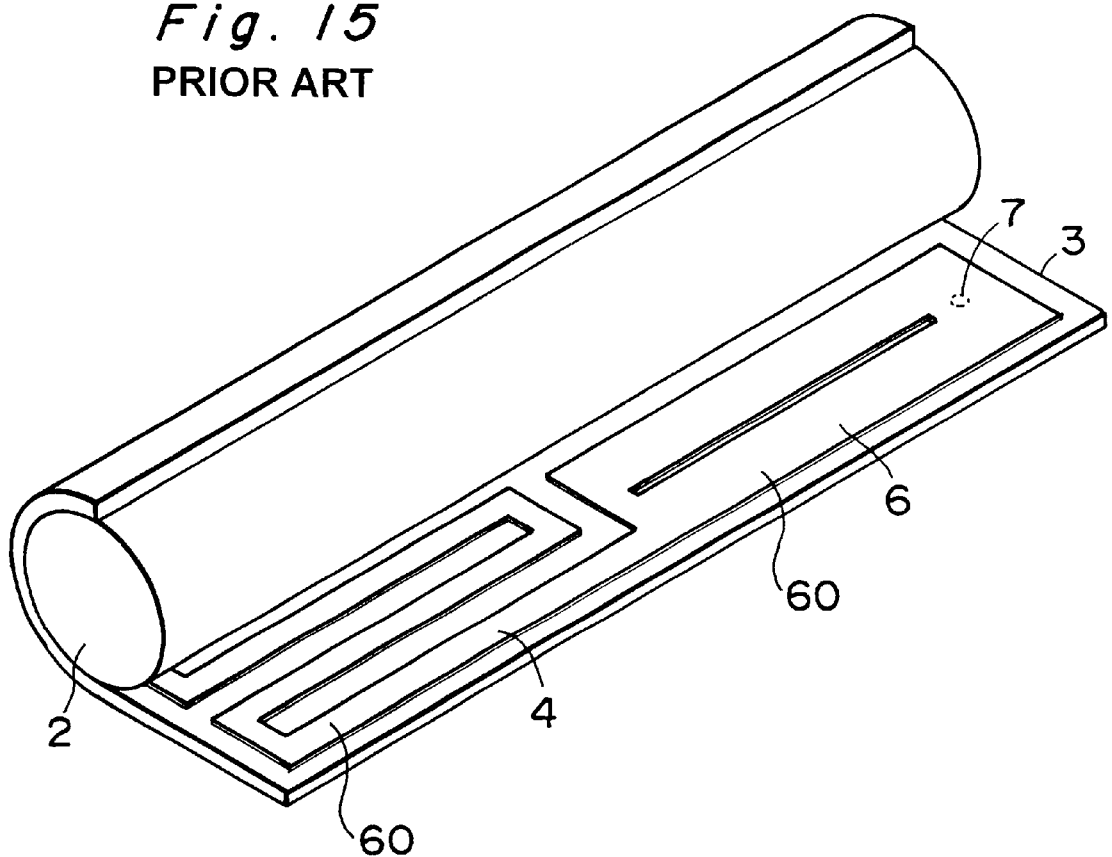
FIG. 15 shows a perspective view of a ceramic heater as fabricating in prior art;.
Figure 16:
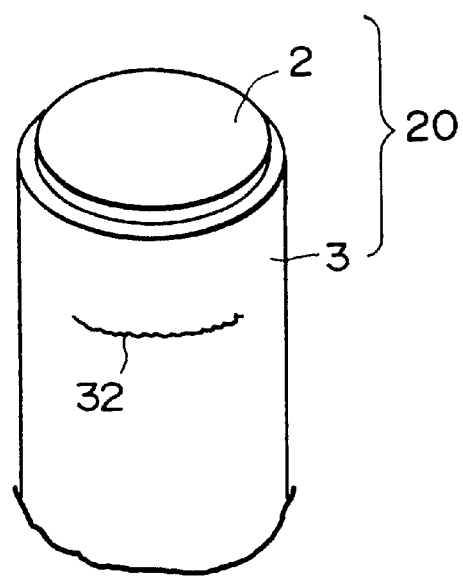
FIG. 16 shows a perspective view of a ceramic heater having a crack formed on its outside.
Figure 18:
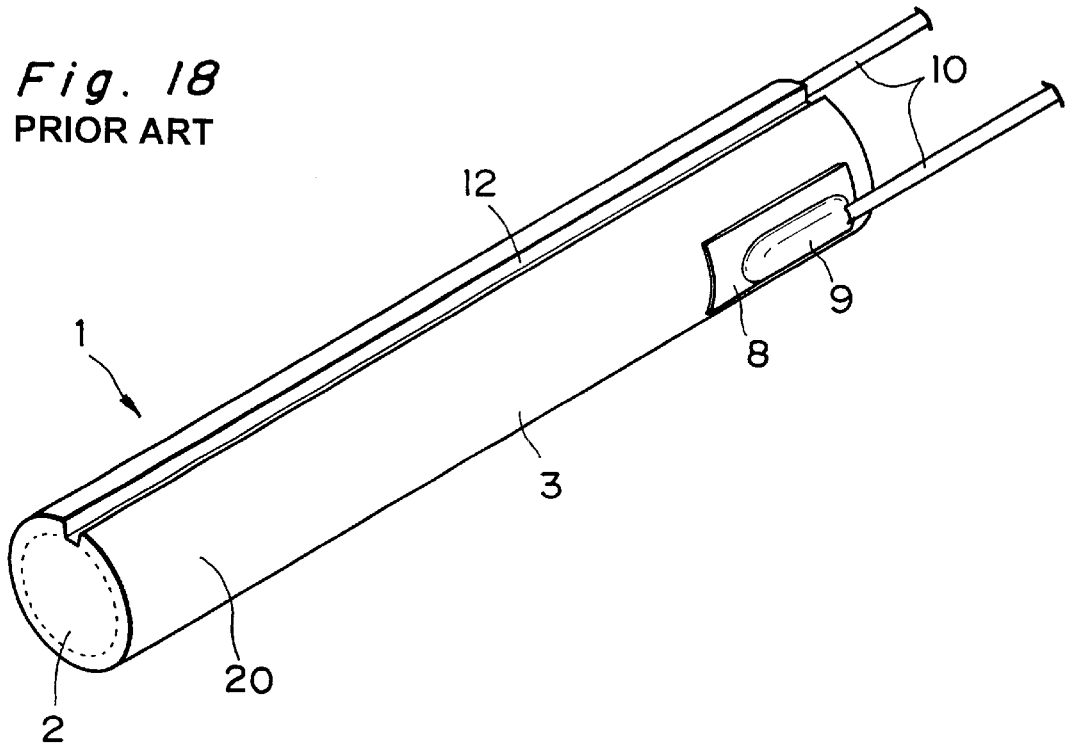
FIG. 18 shows a perspective view of a cylindrical ceramic heater fabricated by prior art.

The ceramic green sheet 3 is wound around the ceramic core 2 such that the heating member 60 is made contact to the surface of the ceramic core 20, as shown in FIGS. 15 and 18, and then fired to form an incorporated ceramic body 20 containing the heating member 60 therein, thus, obtaining a ceramic heater 1.

Embodiment 1

For the ceramic heaters, outer leads 10 for supply of electric power to the heating element 4 are brazed and connected to the pads 8 as shown in FIG. 18, but the pads 8 also are made of the heat-resistant metal similar to that of the heating member 60, which are difficult to braze with a brazing material to connect to the outer leads 10.

The pads 8 on the ceramic heater are previously plated with chromium Cr or nickel Ni or their alloys, to form a plated layer 11, which is easier to braze with said brazing material. Such a plated layer 11 can improve fluidity and wetability of a molten braze thereon to increase the joint strength of the brazed portion between the pads 8 and the outer leads 10.

It is preferably to use, as a brazing material, Cu-based, Au-based, Au—Cu-based or Au—Ni-based alloy. These types of brazing materials may be commercially available, and can advantageously braze to the plated layer 11.

Electroless plating is employed for forming the plated layer 11 on the pads 8, prior to which the pads 8 are previously inserted in an activated solution containing palladium Pd for activation of the pad metal surface, which can facilitate the brazing process of the outer lead 10 to the pad 8.

However, palladium often remains on the surfaces of the pads 8 after the activating treatment in the solution, and the residual palladium Pd on the pad is diffused into the brazing material during brazing. The amount of palladium in the braze layer 9 is preferable to be as low as possible, preferably, about 500 ppm or less. Excessive amount over 500 ppm of palladium Pd in the braze layer 9 decreases the strength of the brazed portion, causing the outer leads 10 to peal from the pads 8, particularly, in use, due to mechanical vibration or repeated heating.

The braze layer 9 containing 500 ppm or less of Pd can maintain enough high strength to prevent breaking, in usual application conditions.

In the activation treating process, prior to the plating, palladium in the solution is preferably absorbed onto a metal surface of the pads, forming a single-atom layer consisting of palladium thereon, and during the electroless plating process, the palladium layer is displaced with a metal layer of plating material, the metal layer serving as nuclei for growing the deposited metal layer to the plated layer 11.

The reason why Pd content is increased in the braze layer 9 will be as follows. In brazing, the excessive palladium resides in a multiple-atom layer absorbed in the pad metal surface, which has not perfectly displaced by the plating metal atoms, and the residual palladium is easily diffused into the brazing material during brazing. This often may occur in the event that, in the activating process, the palladium content is excessively high in the activating solution or that the activation treatment is made too long in time.

It is preferable for activation of the pads 8 to use an activating solution including the amount of 90 ppm of palladium by weight and to immerse the pads along with the ceramic body in the solution for 20 min. or less. In this case the temperature of the solution may be in a range of 40–80° C., particularly, 60±5° C., for the activation treatment.

Figure 3:
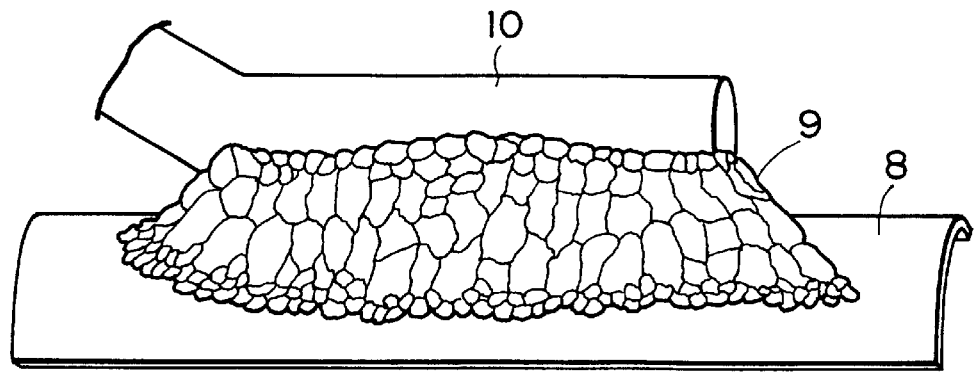
FIG. 3 shows a side view of a brazing portion disposed on the outside of a ceramic heater of an embodiment of the invention.
Figure 4:
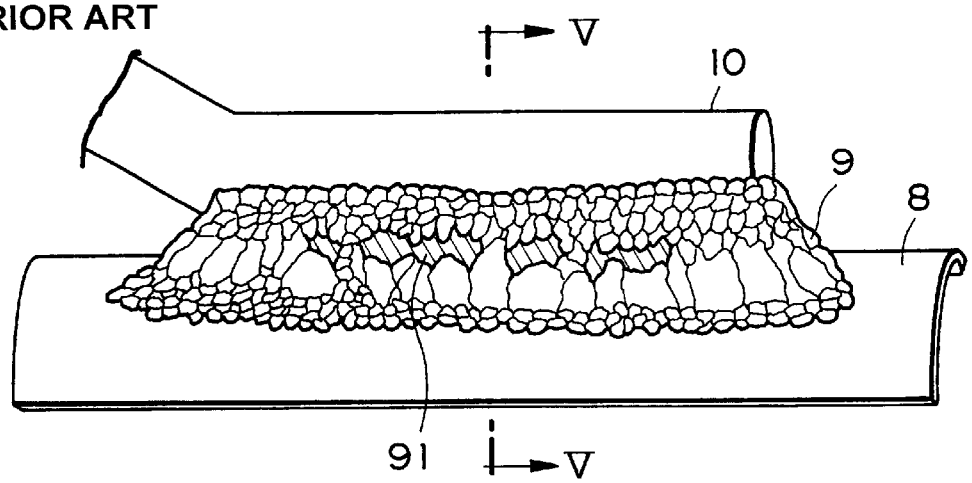
FIG. 4 shows a side view of a brazing portion, in which cracks appears on the braze layer, on the outside of a conventional ceramic heater.
Figure 5:
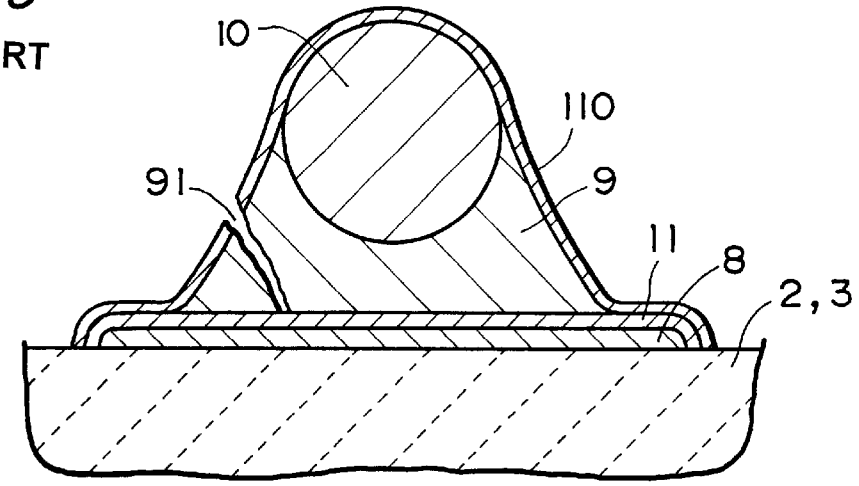
FIG. 5 shows a cross-sectional view of the a brazing portion, in which cracks appears on the braze layer, of the ceramic heater shown in FIG. 4.

A braze layer 9 which joins between the pad and the outer lead may be preferable to have no crack nor cavity in a meniscus. The meniscus of the braze layer 9 which includes palladium of less than 500 ppm shows grain boundaries in hexagonal patterns viewable as shown in FIG. 3, but no cavity appears opening to the meniscus, which would otherwise be seen as shown in FIGS. 4 and 5.

The cavities 9 often having observed in the layer having higher content of palladium are considered to be formed as shrinkage pores during solidifying of the molten brazing material. A part of the cavity may be observed to extend laterally along the braze layer.

It has been seen that as palladium content is increased in the brazed layer, the hardness measured by Vickers hardness of the layer decrease. High palladium content increases a volume of the cavities in the braze layer 9, then lowering the apparent Vickers hardness.

The brazing material may be selected from the group of the alloys previously mentioned such as Cu-based, Au-based, Au—Cu-based and Au—Ni-based alloys. Particularly, Au—Cu based alloys including 25–95% of Au may be used for the blazing material. Alternatively, Au—Ni based alloys containing 50–95% of Au may be used. In these Au—Cu based and Au—Ni based alloys, the brazing temperature can be set to be relatively low, in the vicinity of 1000° C., which is useful to reduce residual stress in the braze layer 9.

Further, those Au—Cu-based and Au—Ni based alloys may effectively prevent migration of the brazed material, in use, in heating devices in high moisture atmospheres.

Further, after brazing the outer leads 10 on the pads 8, it is preferable to plate another metal layer on the surfaces of the braze layer 9 as well as the outer leads 10 to protect the surfaces from corrosion due to atmospheres where the ceramic heaters may be exposed in use. To this end, chromium, nickel, or other corrosion-resistant metal can be used as the second plated layer 110.

Figure 1:
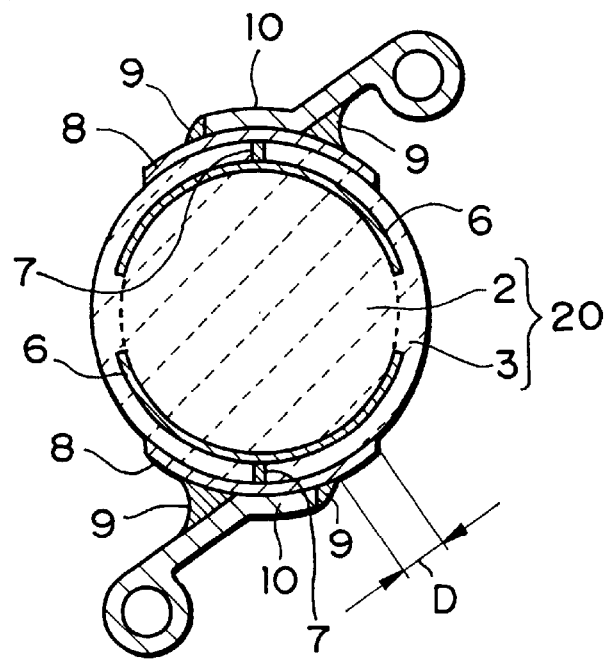
FIG. 1 shows a cross-sectional view of a cylindrical type of ceramic heater of an embodiment of the present invention.
Figure 2:
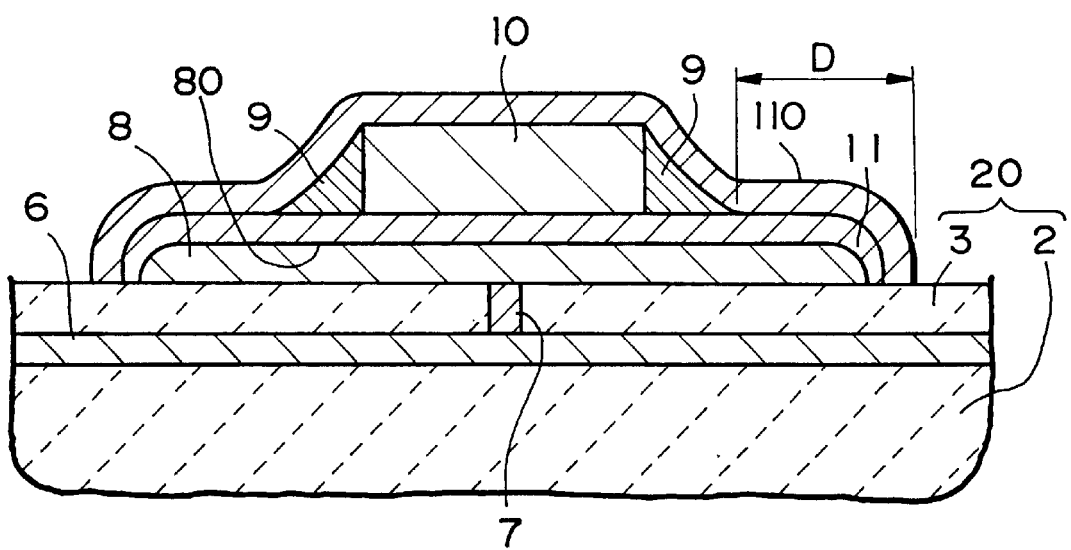
FIG. 2 shows a cross-sectional view of a platelike type of ceramic heater of an embodiment of the present invention.
Figure 6:
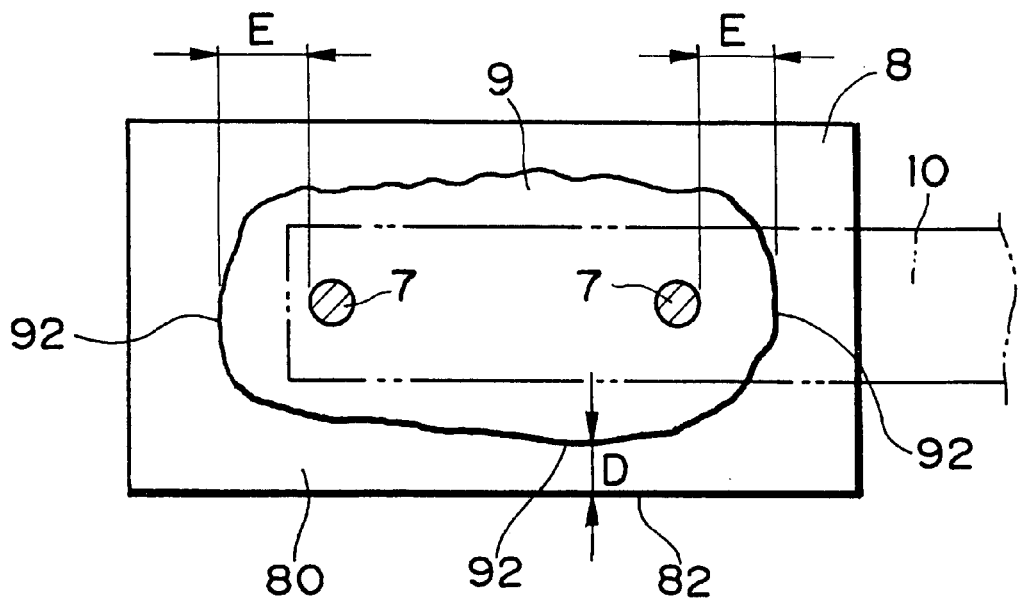
FIG. 6 shows a schematic top view of the brazing portion on a pad on a out side of a ceramic heater of an embodiment of the present invention.

This embodiment of the present invention includes an arrangement of braze layer 9 with respective to the corresponding pads 8 on the ceramic body to prevent pealing of the pads 8 from the surface of the body. Namely, as shown in FIGS. 1, 2 and 6, any edge 92 of the braze layer 9 secured within an area 80 of the pad 8 may preferably be in a minimum distance D of 0.2 mm or more inside from the corresponding peripheral edge 82 of the pad 8, then obtaining a suitable strength of the outer lead 10 against the ceramic body 20.

If the minimum distance D is shorter than 0.2 mm, the pad 8 tends to be pealed from the ceramic body surface, the pealing starting at the edge 82 by the tensile or shearing force resulting from shrinkage of the braze layer 9 during solidification of the brazing material in brazing process, then lowering strength of the brazing portion.

Further, the relative distance between the edge 92 of the braze layer 9 and the via hole 7 is important to maintain the suitable brazing strength. Preferably, the minimum distance E between the edge 92 of the braze layer 9 and the via hole 7, as shown in FIG. 6, may be 0.2 mm or more, then, preventing the brazing material from pealing the pad from the ceramic body.

In the ceramic heater of the embodiment, it is preferable to use, as material of the outer leads 10, a Ni-based alloy or particularly, Fe—Ni alloy to resist high temperatures due to heat transmission from the heating member 60 within the ceramic body 20. Particularly, the outer lead material of the Ni-based alloy or Fe—Ni alloy may be controlled to have mean crystal grain size of 400 $\mu$m or less, under the brazing condition, to prevent brittleness of the material.

Using coarse-grained material over 400 $\mu$m in grain size, there would be somewhat higher a risk of cracking the outer leads 10 at the brazing portion by material fatigue due to mechanical vibration or repeatedly thermal shocks given to the ceramic heater. Also, in outer leads 10 using other materials than the above Ni-based and Fe—Ni alloys, preferably, the grain size may be set to be lower than a thickness of the lead itself, to avoid fatigue breakage by stress concentration. As the mean grain size is greater than the thickness, there would be a risk of stress concentration at some grain boundaries near the interface between the outer lead and the braze layer 9, which results in cracking of the outer lead.

While the brazing temperatures are required to be enough high above the melting point of the brazing material to secure a suitable brazing characteristics with less dispersion among ceramic heaters, it is preferable to lower brazing temperatures and shorten heating period of time to ensure fine-grained structure in the outer leads 10 having 400 $\mu$m or less of grain size.

Figure 7:
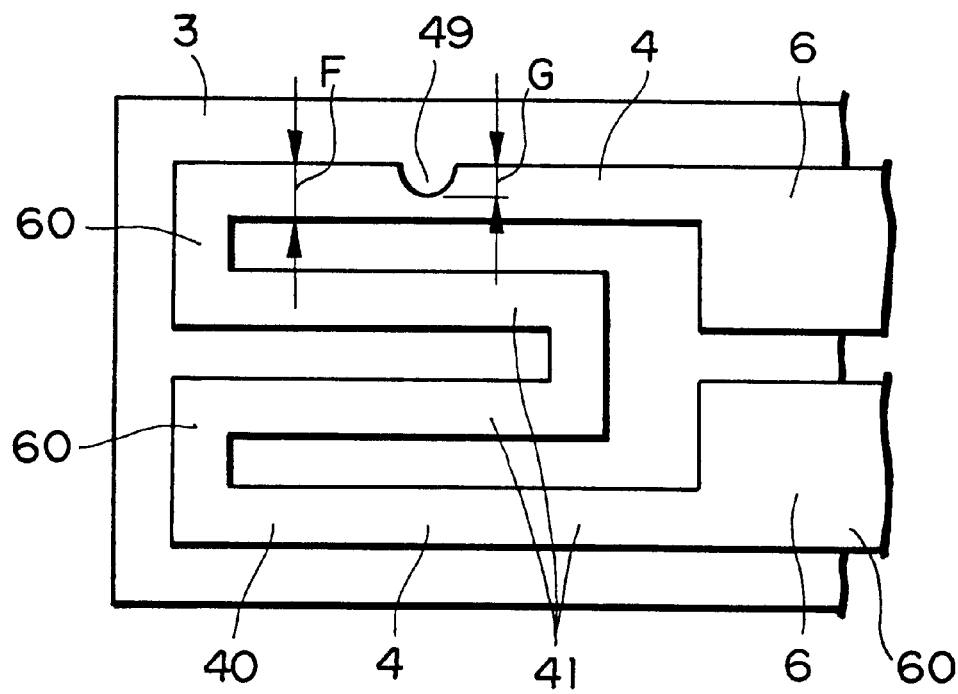
FIG. 7 shows a plan view of a heating element pattern disposed on a ceramic green sheet to be used in fabricating a ceramic heater on an embodiment of the present invention.

Preferably, in the ceramic heater 1, a heating element 4 has no notched defect in the patterned resister segments 41, but, if any notch, the segment may have a tolerance limit of a notch as a defect within a notch width G of a half or less of the width F of the segment, as illustrated in FIG. 7. The notch width G of the defect greater than one-half the segment width would degrade the durability of heaters since the narrow portion has high electric resistance in the heating element 41 and is apt to be overheated so excessively, in use, as to be finally broken down.

Such defects on the segments 41 of the heating element 4 are thought to result from some dusts to have attached on the paste in printing the pattern 40 on the green sheet 3, or some inclusions to have mixed into the printed pattern 40, which is burned out to make a hole or notch 49 in the heating element 4 during sintering. It is necessary to raise the degree of cleanness in printing and winding steps where the green sheets are dealt with in fabricating process, and also to provide a carefully inspecting step for removing defected ceramic heater products for the process, in order to prepare against the defects occurring in the heaters.

A ceramic body 20 may includes a ceramic based on aluminum oxide, aluminum nitride, silicon nitride, silicon carbide, or other ceramic which is thermally conductive, electrically insulating, and thermally resistant.

As an example of the ceramic body 20, a ceramic material containing 88–95% by weight of $Al_2O_3$, 2–7% by weight of $SiO_2$, 0.5–3% by weight of CaO, 0.5–3% by weight of MgO, and 1–3% by weight of $ZrO_2$ may be used. The $Al_2O_3$ content under the lower limit of 88% would increase the glassy phase in the ceramic structure so that the metal heating element 4 is relatively easily migrated in the ceramic body 20 while being heated. On the contrary, the $Al_2O_3$ content higher than 95% would degrade endurance of the ceramic heater since there is less glassy component in the ceramic which can be secured to metal film of the metal segment 4.

Figure 19:
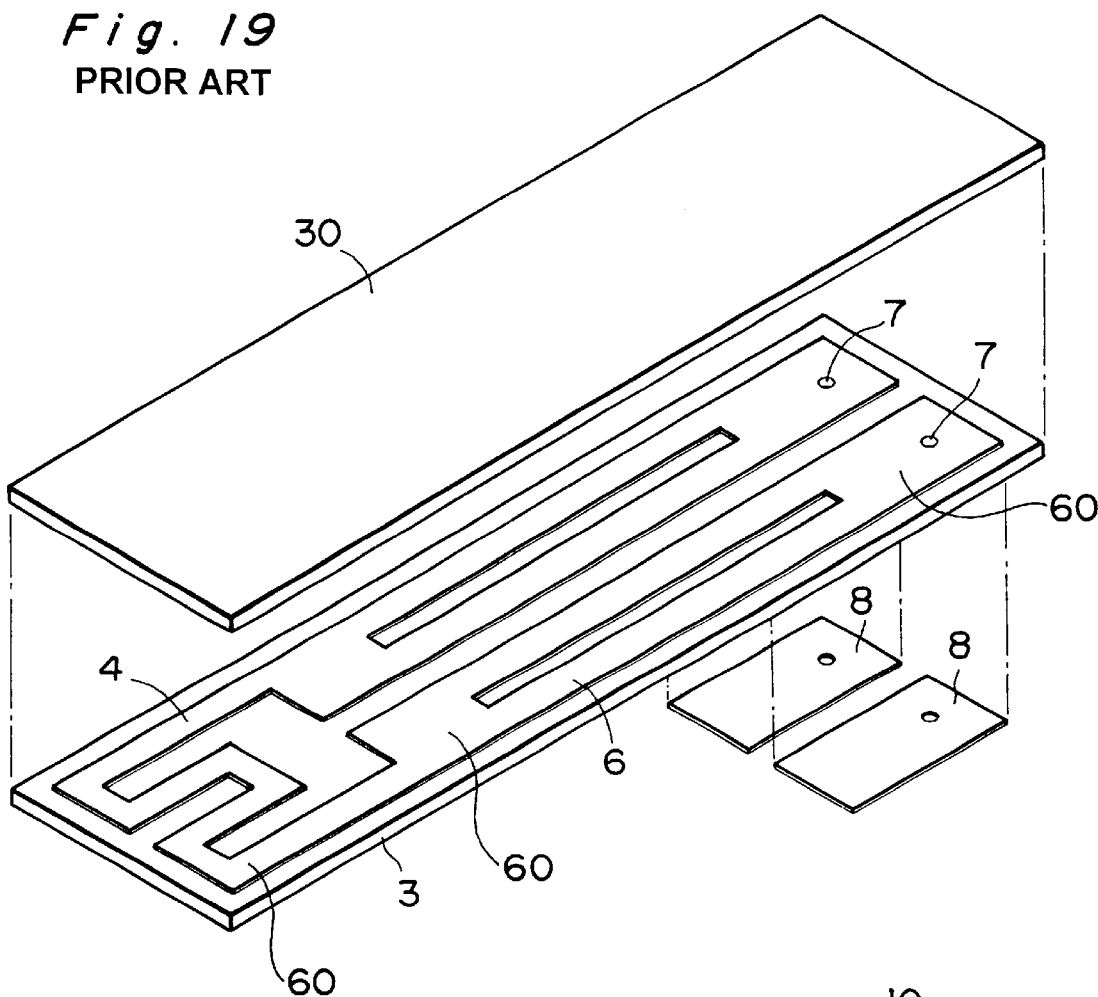
FIG. 19 shows a shows a perspective view of a platelike ceramic heater which is fabricating with a ceramic sheet and a ceramic green sheet having a heating member printed thereon.
Figure 20:
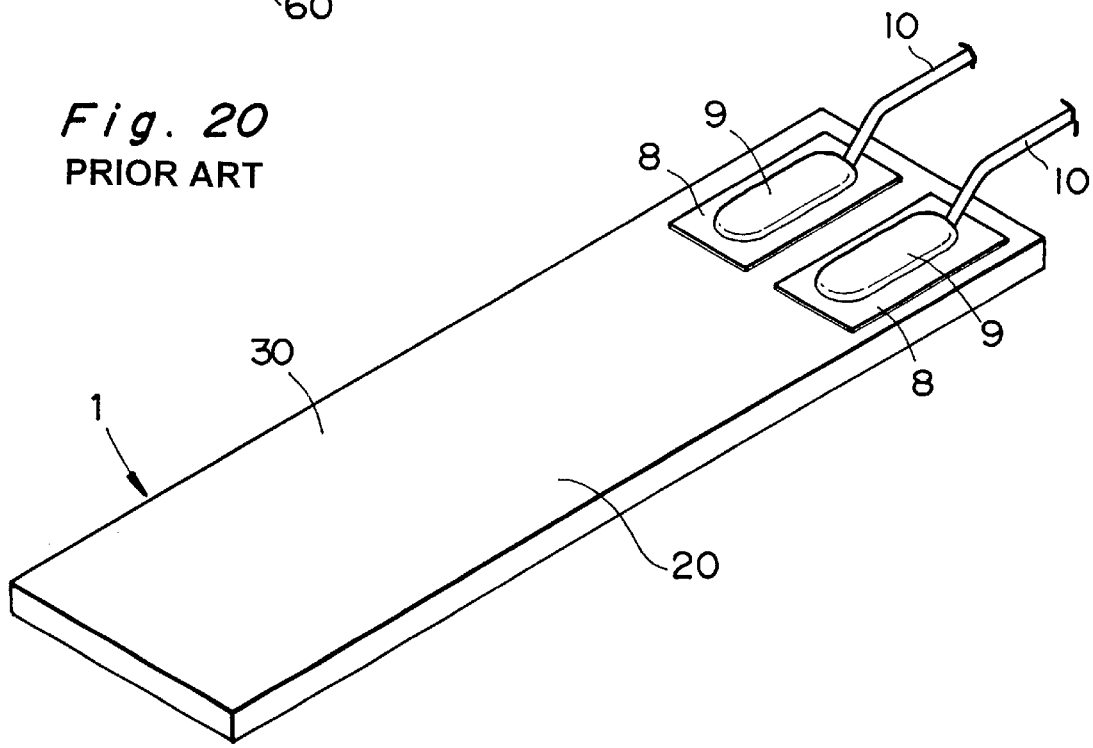
FIG. 20 shows a perspective view of a platelike ceramic heater fabricated in prior art.

The ceramic body 20 in the embodiment may take the form of any of cylinder, rod, plate or the like. As shown in FIGS. 19 and 20, such a platelike ceramic body may be fabricated as follows: First, on one surface of a ceramic green sheet 3 prepared with a mixture containing a ceramic powder is applied a paste including high melting point metal, for example, of tungsten, molybdenum or rhenium as a main ingredient in a desired pattern of a heating member 60, including a heating element 4, a pair of inner leads 6, and via holes 7.

On the other surface of the green sheet applied is a paste for pads 8 as electrodes by a paste including high melting point metal which may be the same as the above metal for the heating member. Next, another ceramic green sheet 30 of the same composition is attached integrally onto the patterned surface of the above green sheet 3, and these laminated sheets are fired in a reducing atmosphere at a temperature of 1500 to 1600° C. for sintering into a platelike ceramic heater.

The resulting platelike ceramic heater is immersed in an activating solution as mentioned previously in order to activate the surfaces of the pads 8 made of the high melting point metal, which pads are plated to form a plated layer 11 of a metal such as chromium or nickel. Further, a pair of outer leads 10 are connected to the pads via the plated layer 11 by brazing the brazing material mentioned above.

The ceramic heaters may have, for example, a diameter or width of 2–20 mm, and length of 40–200 mm, depending on the heater applications. For example, heaters having dimensions of a diameter or width of 2–4 mm and length of 50–60 mm may be used for air/fuel ratio controllers of motor vehicles.

Further, for such motor vehicle applications, the heating element 4 may have the length of 3–15 mm. The heating element 4 is a heating resister made of a continuous narrow strip portion connected to the inner leads, as shown in FIG. 1. The length lower than 3 mm would degrade the durability of the heating member 60, in spite of fast heating as supplied with power. On the contrary, the length higher than 15 mm would require higher supply power to ensure a suitable heating rate of the ceramic heater.

EXAMPLE 1

Figure 8:
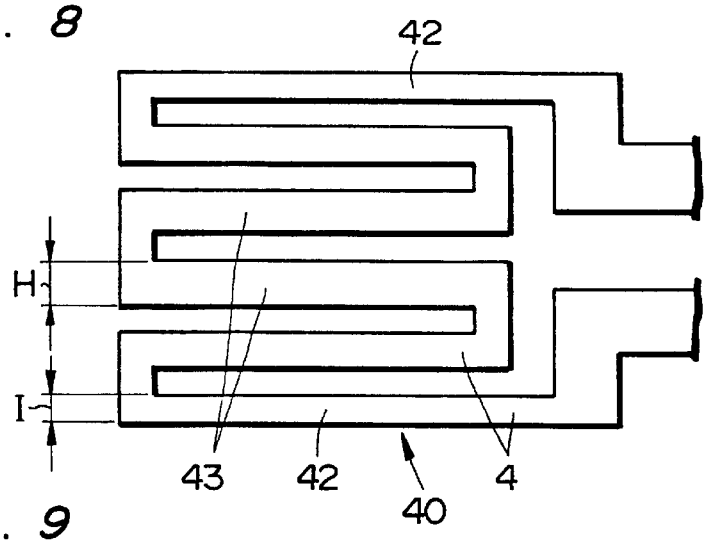
FIG. 8 shows a plan view of another heating element pattern disposed on a ceramic green sheet to be used in fabricating a ceramic heater on another embodiment of the present invention.

Green sheets 3 were prepared of a mixture of a total amount of 10% or less of $SiO_2$, CaO, MgO and $ZrO_2$ and the balance of $Al_2O_3$. Pastes for a heating element 4 including a mixture of W and Re metal powders and for inner leads 6 of W powder were printed on one side of the sheet at the respective defined portions, and on the other side of the sheet is printed pads 8 of W powder paste. The heating element 4 is formed in a pattern of triple-folded segments on the surface of the sheet, as shown in FIG. 8.

For the sheet, a pair of via holes were each pierced through the sheet 3 and the respective tungsten pads 8 to reach the inner leads 6, and filled with a conductive paste to conduct each off the pads 8 to the respective inner leads 6.

The ceramic green sheet was wound around a elongated ceramic core 2 in such a manner that the patterned paste formed on the sheet is made contact to the outer surface of the core, the ceramic core having almost the same composition of the sheet, and then sintered at 1500–1600° C., obtaining a ceramic heater.

The pads 8 on the resultant ceramic body were subjected to activated treatment, as mentioned above, using a Pd-containing treating solution, and were electroless plated to form a Ni-plated layer 11 of 3 μm in thickness on each pad. In the activating processes, as parameters, Pd concentrations were changed at levels of 30 ppm to 150 ppm of Pd in the solutions, and the immersing periods of time were changed at levels of 2 to 60 min. Then, 50 ceramic heaters at each level were fabricated to provide for the following steps.

After heating at 600° C. in a hydrogen-nitrogen atmosphere, a pair of outer leads 10 of Fe—Ni—Co alloy were brazed on the respective pads 8 by using the brazing material of a Au—Cu based alloy, such a structure of the brazing portion on the outside of the ceramic heater being shown in FIG. 1.

After brazing, the ceramic heaters were tested to determine Pd concentration in the braze layers 9 and to measure tensile strength of the braze layer when the outer lead 10 is stretched relative the surface of the ceramic body 20, in a tensile direction perpendicular to the brazed surface of the ceramic body 20.

The cut areas of the braze layer 9 were analyzed by the electron micro-prove analysis (EPMA) technique, using JXA-8600M analyzer made by Japan Electron, Co., under conditions of voltage 15 kV, current of $3\times10^{-7}$ A and an analyzed spot area of 50 μm square. In this analysis, contents of Au, Cu, Ni and Pd in the cut surface were quantitatively measured, and the data were then calibrated by ZAF method to obtain palladium content.

Hardness of the cross-section of the braze layer was measured by Vickers technique at weight of 100 g. Data of 5 measured points each sample were averaged.

The results are shown in Table. 1.

TABLE 1

| Samp | Pd cont. solution (ppm) | Treat Time (min) | braze mater. | Pd cont. (ppm) | apparnt surface | Strength | Hv |
|---|---|---|---|---|---|---|---|
| 1 | 30 | 10 | Au-Cu | 50 | good | >200 | 155 |
| 2 | 60 | 10 | Au-Cu | 70 | good | >200 | 153 |
| 3 | 90 | 10 | Au-Cu | 200 | good | >200 | 150 |
| 4 | 90 | 20 | Au-Cu | 500 | good | >200 | 154 |
| 5 | 100 | 10 | Au-Cu | 400 | good | >200 | 152 |
| 6 | 100 | 10 | Au-Cu | 600 | cavity | 120 | 138 |
| 7 | 120 | 10 | Au-Cu | 1500 | cavity | 100 | 135 |
| 8 | 150 | 10 | Au-Cu | 3300 | cavity | 70 | 121 |
| 9 | 60 | 2 | Au-Cu | 40 | good | >200 | 157 |
| 10 | 60 | 20 | Au-Cu | 100 | good | >200 | 153 |
| 11 | 60 | 30 | Au-Cu | 250 | good | >200 | 151 |
| 12 | 60 | 60 | Au-Cu | 1200 | cavity | 110 | 129 |
| 13 | 60 | 10 | Au-Ni | 60 | good | >200 | — |
| 14 | 150 | 10 | Au-Ni | 3100 | cavity | 100 | — |
| 15 | 60 | 10 | Ag-Cu | 90 | good | >200 | — |
| 16 | 150 | 10 | Ag-Cu | 3400 | dull | 80 | — |
| 17 | 60 | 10 | Ag | 80 | good | >200 | — |
| 18 | 150 | 10 | Ag | 3500 | dull | 80 | — |

It is found from Table 1 that the samples having low lead-pad strength are common to high Pd contents in the braze layer, but that the samples showing high strength of 200 N or more contain Pd contents of 500 ppm or less.

In the samples showing low strength, cavities were observed in the braze layer 9 having formed in the brazing process, and the tensile tests showed that the brazing portions are destroyed at low strength as shown in FIG. 1, the failure taking the form of braze layer separation caused by shearing the weakened braze layer with cavity. On the contrary, the samples of low Pd content in the braze layer 9 had no cavity therein, and failure mode was ceramic breakage, this meaning that the braze layer 9 has enough high strength.

Turning attention to Table 1, in Sample Nos. 6–8 and 11–12, the presence of cavities in the braze layers and low lead strength were observed, while other samples have high strength and no cavities. This, of course, clearly shows an intimate correlation between the apparent presence of cavity and the low braze layer strength.

It is seen from the Table 1 that, in order to maintain the Pd contents of 500 ppm or less in the braze layer 9, it is preferable to maintain the Pd content of 80 ppm or less in an activating solution for immersing the pads and to set immersing period of time to 20 min. or less.

With respect to hardness on the braze layer, the samples having high strength over 200N in the braze layers shows the high hardness of Hv 150 on the layers.

EXAMPLE 2

In this example, relations between materials of the braze layers and tensile strength of the outer leads to the brazing material were studied. The samples of ceramic heaters were prepared in the same manner that shown in the previous example, and activated to pads 8 under similar conditions to Sample No. 2 showed in Table 1, and then, outer leads 10 were brazed to the pads with the following brazing materials: Au—Cu binary alloys having various compositions of Au and Cu; and Au—Ni binary alloys having various positions of Au and Ni, which are listed in Table 2.

The samples were tested to measure the braze layer strength before and after they were subjected to 5000 heat cycles of repeating 3-minute heating at 400° C. and 3-minutes cooling at 30° C.

The results are shown in Table 2.

TABLE 2

| | Brazing material (weight ratio) | | lead strength (N) | |
|---|---|---|---|---|
| Sample | Au:Cu | Au:Ni | initial | after test |
| 1 | 0:100 | — | >200 | 40 |
| 2 | 20:80 | — | >200 | 60 |
| 3 | 30:70 | — | >200 | 100 |
| 4 | 50:50 | — | >200 | 110 |
| 5 | 70:30 | — | >200 | 120 |
| 6 | 90:10 | — | >200 | 110 |
| 7 | 100:0 | — | >200 | 90 |
| 8 | — | 20:80 | >200 | 70 |
| 9 | — | 30:70 | >200 | 100 |
| 10 | — | 50:50 | >200 | 100 |
| 11 | — | 70:30 | >200 | 120 |
| 12 | — | 90:10 | >200 | 80 |

It is seen from Table 2 that the samples having compositions of 30% to 90% of Au in the Au—cu alloys and of 30% to 70% of Au in the Au—Ni alloys can exhibit high strength, of the braze layer 9, over 100N even after the heat endurance test.

On the other hands, Sample Nos. 1–2, 7–8 and 12 are, in brazing, heated at about 1050° C. which is higher brazing temperatures than the rest samples, securing sufficient strengths of the braze layers at least 200N for usual applications of ceramic heaters. Therefore, pure Au and Ni metals, and also high terminal Au or Ni compositions in Au—Cu alloys and Au—Ni alloys may be used for the brazing materials.

EXAMPLE 3

In this example, there were determined relations of the braze layer strength to a minimum distances D from edges of the braze layers 9 to the edges of the pads 8. The minimum distances D are set to be 0.05 to 0.5 mm in the brazing step, and braze layer strengths were measured by stretching the brazes outer leads 10 with respect to the ceramic body 20.

The results are shown in Table 3.

TABLE 3

| Sample | Distance betwe. pad and braze layer (mm) | Lead strength (N) |
|---|---|---|
| 1 | 0.05 | 60 |
| 2 | 0.1 | 100 |
| 3 | 0.2 | 180 |
| 4 | 0.3 | >200 |
| 5 | 0.4 | >200 |
| 6 | 0.5 | >200 |

In Table 3, the samples having the minimum distance of 0.2 mm or more, particularly, 0.3 mm or more, show high strength of 180N or more, particularly, over 200N, respectively. In the samples of a shorter minimum distance than 0.2 mm, the strength is reduced to 100N or less. It was observed that the pad started to peal at its edge near the edge of the braze layer 9, with the peal extending over the ceramic surface.

EXAMPLE 4

In this example, minimum distances E of the edge of the braze layer 9 to the via hole 7 of the ceramic body 20 were changed in some levels of 0.05 mm to 0.5 mm, and samples were prepared in the same manner that of Example 1. For each sample, the strength of the outer lead 10 to the ceramic body 20 was measured.

The results are shown in Table 4.

TABLE 4

| Sample | Distance betwe. via hole and braze layer (mm) | Lead strength (N) |
|---|---|---|
| 1 | 0.05 | 50 |
| 2 | 0.1 | 90 |
| 3 | 0.2 | 180 |
| 4 | 0.3 | >200 |
| 5 | 0.4 | >200 |
| 6 | 0.5 | >200 |

As shown in Table 4, an increase in minimum distance E between the via hole 7 and the edge of the braze layer 9 increase strength of the braze layer. In testing Sample Nos. 1 and 2 as shown in Table 4 having a shorter minimum distance, the via hole in the ceramic body 20 was first destroyed, and then the braze layer was pealed from the ceramic surface. On the contrary, the samples with the minimum distance E of 0.2 mm or more show sufficient strength higher 200 N.

EXAMPLE 5

This example shows the relation between mean grain sizes of the outer lead 10 and crack generation in the outer lead during the cyclic heating test for endurance. The outer leads 10 were selected from a strip of Ni metal and an Fe—Ni—Co alloy with a width of 0.5 mm and an area of 2.5 mm×2.0 mm for depositing a braze layer in the brazing step, the structure of the brazing portion of the ceramic heater is shown in FIG. 2.

The presence of cracks on the end portion of the braze layer 9 were observed after the heat endurance test which was conducted somewhat similarly to that mentioned in Example 2 but under conditions of repeating 3-min. heating at 400° C. and 2-min. cooling at 30° C.

The mean grain sizes were determined by etching the mirror surface of the outer leads at the brazing portion of ceramic heaters, to make grain boundaries apparent, and, photographing the expanded surface by a microscope, and on the micro structure photograph, counting the number of grains intersected by a line segment having a defined length drawn on the structure. The mean grain size is defined as a value of the segment length divided by the number of the intersected grains. Cracks were observed on the apparent surface of the braze layer 9 in microcopy.

The results are shown in Table 5.

TABLE 5

| Sample | Mean grain size μm | outer lead material | apparent after heat cycle |
|---|---|---|---|
| 1 | 190 | Ni | good |
| 2 | 280 | Ni | good |
| 3 | 400 | Ni | good |
| 4 | 550 | Ni | crack |
| 5 | 160 | Fe—Ni | good |
| 6 | 270 | Fe—Ni | good |
| 7 | 390 | Fe—Ni | good |
| 8 | 450 | Fe—Ni | crack |

From this Table 5, it is seen that mean grain sizes over 400 μm after endurance test can produce cracks on the braze layer surface, but no crack is observed in samples having 400 μm or less of grain size.

EXAMPLE 6

In this example, there was studied an effects of pattern defect of heating elements on endurance of ceramic heaters. Ceramic green sheets 3 were printed with a paste pattern of a heating element and inner leads on a side thereof, and a very small part at the edge of a segment in the heating element 4 is removed to make a notch as a pattern defect 14. The ceramic green sheet 3 is attached to another ceramic sheet to incorporate to each other and fired to a platelike ceramic heater.

The defect parts 14, i.e., notches, are prepared to have the width G with ratios G/F to the segment width F, as shown in FIG. 7, the ratios G/F being set in a range of 1/10 to 7/10.

The samples having such an artificially defected heating element were endurance tested in 500 cycles repeatedly from heating to max. 1100° C. for 2 min., supplied with power, to rapid cooling for 2 min. The samples having resistance change over 1% before and after the endurance test was considered defective products.

The results are shown in Table 6.

TABLE 6

| | Ratio of defect to segment width | Percentage of resistance change (%) |
|---|---|---|
| 1 | 1/10 | 3 |
| 2 | 2/10 | 4 |
| 3 | 3/10 | 5.5 |
| 4 | 4/10 | 7 |
| 5 | 5/10 | 10 |
| 6* | 6/10 | 12 |
| 7* | 7/10 | 23 |

From this Table 6 it is understood that the samples having the defects of the ratios 6/10 or more show higher resistance change of 10% and that the ratios should be lower than 5/10 for the stability of heating element for long useful life.

Embodiment 2

In this embodiment of the present invention, the pattern of the heating element 4 is provided to improve the heat shock resistance in the case of quick heating.

The pattern 40 of the heating element takes the form of waving a plurality of segments 41 of thin metal film, which are disposed parallel to one another. In this embodiment, the heating elements in a central portion of the pattern 40 may preferably be adjusted to have an electric resistance per unit length which is 75% to 90% of electric resistance per unit length of segments in the peripheral portion thereof.

To this end, in one method, the plurality of segments may be aligned to an axial direction as shown in FIG. 8, and then the width I of the peripheral segments 42 may be in a range of 75% to 90% of the width H of the central segments 43 of the element. All the segments of the heating element 4 may preferably have substantially equal thickness of the metal film. While in FIG. 8 are shown three folds of segments, if more folds of the segments are used, the width may be set to be reduced as the segment is peripheral from the central portion of the pattern.

In this range of the previously defined widths, the heating element 4 is uniformly heated over its patterned area, as a current is passed through the pattern, to keep low temperature difference in a range of 100° C. or less between the maximum and minimum temperatures around the ceramic body 20, then, preventing any crack from appearing in the patterned heating element 4.

If the resistance of the central segments 43 of the heating element is higher than 90% of that of the peripheral segment 42, the central portion may be cracked due to the overheating of this portion, and if the resistance of the central segment 43 is lower than 75% of that of the peripheral segment 42, the peripheral portion of the heating element may be cracked due to overheat.

Figure 11:
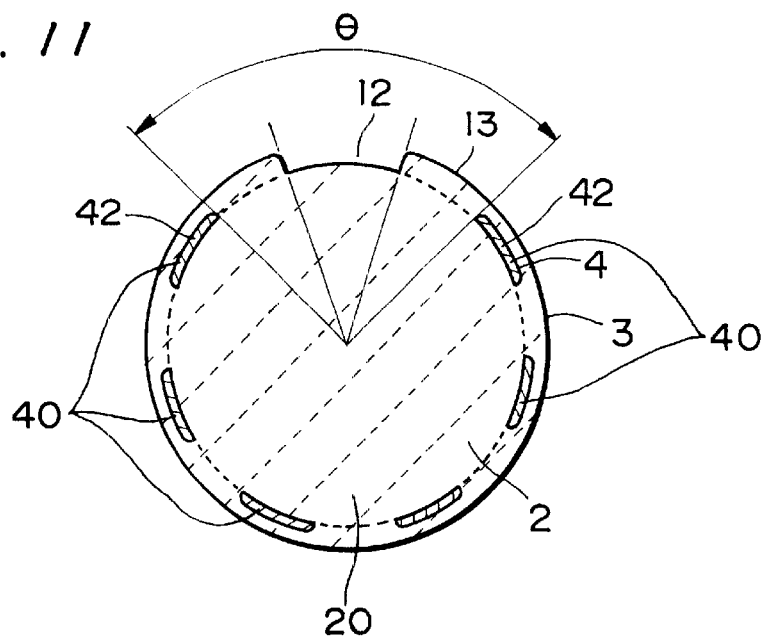
FIG. 11 shows a cross-sectional view of a ceramic heater, taken at a cross section including a heating element pattern, according to anther embodiment of the invention.

In fabricating the ceramic heater, where the ceramic green sheet 3 is wound around and stacked to the ceramic core, both edges of the sheet are spaced in no contact to each other, with a space necessary to sealingly secure the sheet to the ceramic core, and the segment pattern is disposed inside the width of the ceramic green sheet, therefor, the heating element is disposed on the ceramic core with some distance between both edges of the pattern 40 (e.g., outer edges of most peripheral segments 42 and 42 in the pattern in FIGS. 8 and 11).

In this embodiment, the distance between both edges of the pattern 40 wound around the ceramic body 20 may be limited to an angle θ of both edges viewed from the center of the ceramic core 2 to 90 degrees or less as show in FIG. 11. In this range of the angle θ, the cracking of the pattern during high speed heating may be prevented, whereas the angle higher than 90° is apt to increase the higher temperature difference in the pattern around the ceramic body 20 over 100° C. during heating, resulting in the cracking of the heating element.

In practice of fabrication, an edge 13 of the green sheet 3 which the pattern 40 does no cover, preferably may be more than 0.2 mm within the limitation of the above-mentioned angle between the pattern edges.

Also, the pattern 40 of the heating element 4 may preferably have a length axially of a range of 2.5 to 10.0 mm with respect to a ceramic heater having a size of 2 to 5 mm in diameter. The pattern 40 which is shorter than the lowest length is apt to be superheated because of concentration of heating, resulting in cracking the highest temperature portion of the pattern, and the pattern longer than 10.0 mm causes low speed heating and, in starting operation, high energy consumption for increasing the heating rate.

Figure 9:
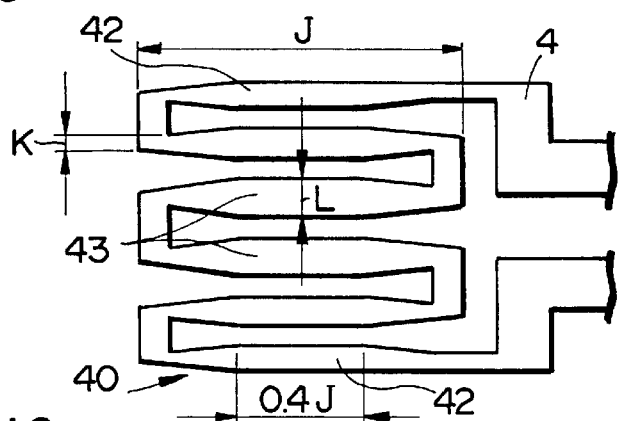
FIG. 9 shows a plan view of another heating element pattern disposed on a ceramic green sheet to be used in fabricating a ceramic heater on another embodiment of the present invention.

A heating element in this embodiment may have a segment width, in a central portion of the patterned heating element, of 20% to 90% of that in a peripheral portion, of the heating element, preventing cracking in the heating element. In FIG. 9, in a axial length of the segments on a pattern, width K at both ends of the segments 43 may be set to be 20 to 90% of the width L, in a central region, of the segments 43. If the width ratio k/L is less than 0.2, both peripheral portions of the pattern 40 is superheated to be broken with a crack thereon when heated at very high speed, for example, raising a temperature change of 900° C. in 3 seconds. On the contrary, the width ratio K/L exceeding 0.9 can not improve the cracking tendency in the central portion of the pattern 40.

Figure 10:
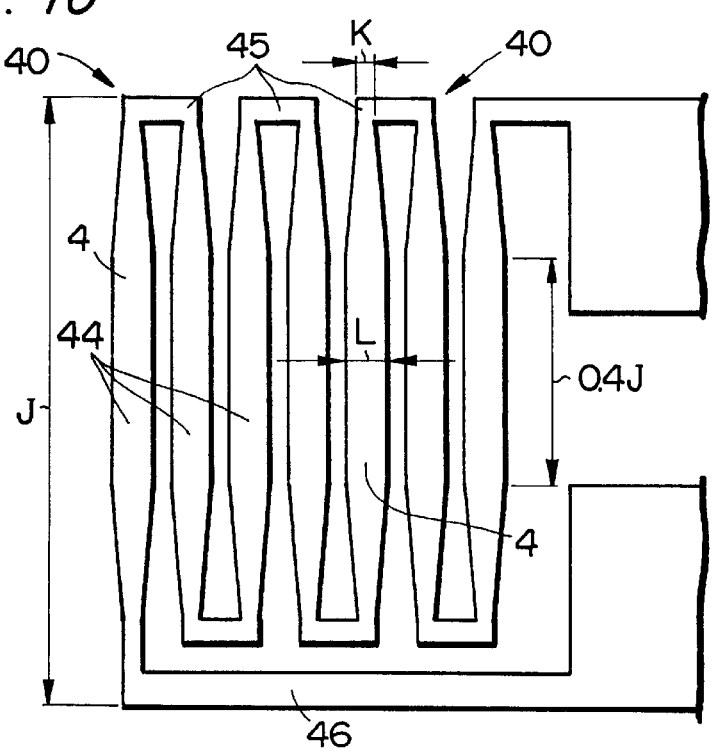
FIG. 10 shows a plan view of further another heating element pattern disposed on a ceramic green sheet to be used in fabricating a ceramic heater on another embodiment of the present invention.

FIG. 10 shows segments 44 being oriented circumferential around the ceramic core, the segments 44 being connected parallel to one another in series by terminal segments 45 in a pattern 40 of a heating element 4. In this case, each segment 44 has a wider part of width L in a range of 40% of the segment length J in the central portion, and a narrower part in the peripheral portion having a width K of 20–90% of the width L of the central portion. This structure of the heating element have a similar effect of preventing the local superheating of the pattern.

Further, the segments of the heating element may have $1000 \times 10^{-6}$/° C. to $1500 \times 10^{-6}$/° C. of a temperature coefficient of electrical resistance to relax heat shock at the beginning of heating with an initial current lowered for heating.

The heating member 60 of the invention may include a braking element 5 which has a higher positive temperature coefficient of electrical resistance than that of segments of the heating element 4 and which is disposed under the ceramic sheet and connected between the heating element 4 and the pads 8 in series, for supplying an electric power.

When the heating element and braking element are supplied with a large current to heat quickly the heating element, the resistance of the braking element is faster increased than the heating element during temperature rising, then the voltage, i.e., the power, applied to the heating element is lowered so that the temperature rising rate is somewhat reduced to prevent an overshoot of the temperature.

Figure 12:
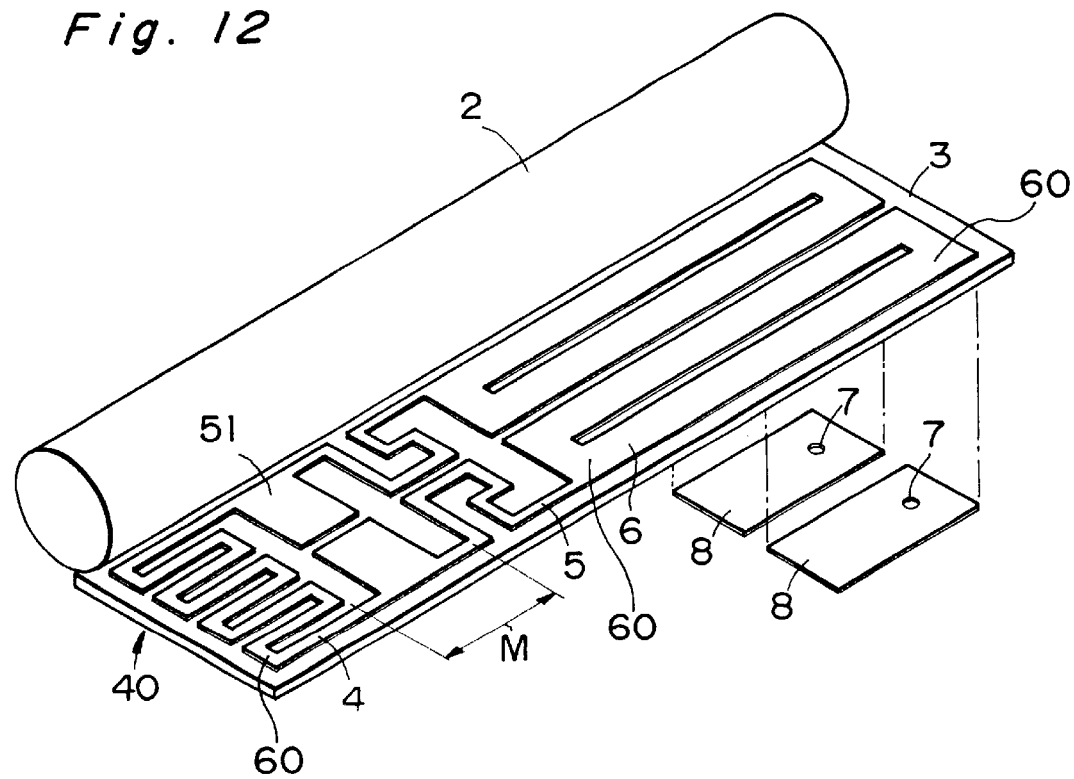
FIG. 12 show a perspective view of a structure for fabricating a ceramic heater, showing a braking element arranged in the heating member which is printed on the sheet, according to another embodiment of the present invention.
Figure 13:
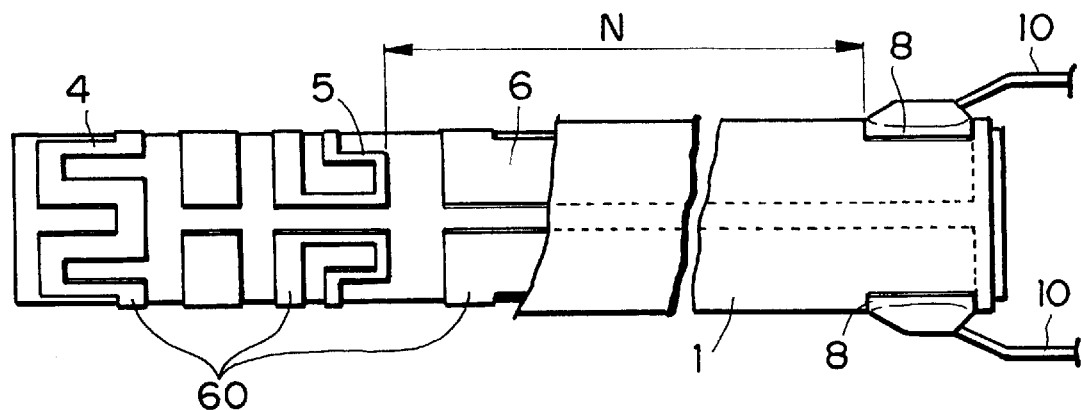
FIG. 13 shows a partially cross-sectional, side view of the ceramic heater shown in FIG. 12, according to the present invention.
Figure 14:
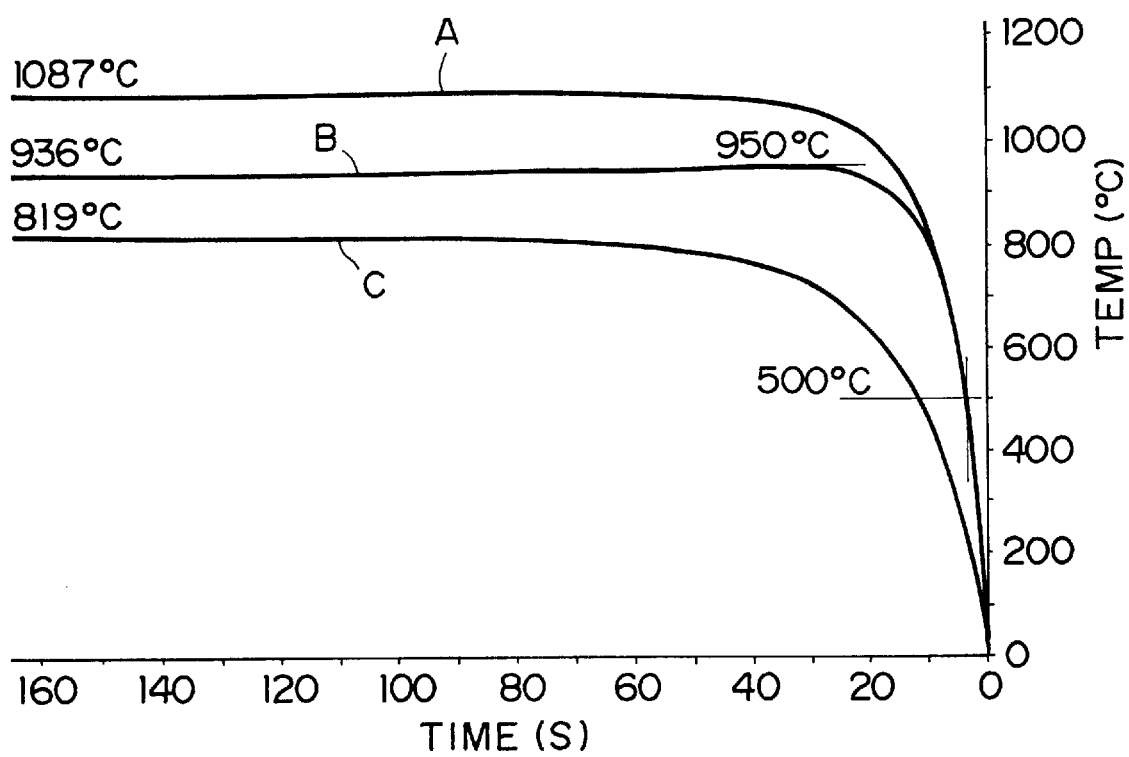
FIG. 14 shows a graph showing temperature carves in heating a ceramic heaters, with and without having braking element.

FIGS. 12 and 13 show an arrangement of a braking element 5 disposed between and electrically connected between the heating element 4 and the inner leads 6.

Particularly, the resistance temperature coefficient of the braking element 5 may be set to be, for example, in a range of $2000 \times 10^{-6}$ to $4500 \times 10^{-6}$/° C., which is positively higher than the previously mentioned value of $1000 \times 10^{-6}$/° C. to $1500 \times 10^{-6}$/° C. of the heating element.

Further, in order to secure the effect of quick heating on preventing the overshoot, a ratio of cumulative electric resistances of the heating element 4 to the braking element 5 may be set to be in a range of 1.5 to 10.0.

In the ceramic heater of this embodiment, the heating element may be made of a We—Re based, W—Mo-based or Mo—Re based alloy to reduce a temperature dependence of resistance. Such alloyed materials have relatively higher phonon dispersion, as compared with pure metal Mo, W or Re, so that the resistance of the alloy remains higher from room temperature to the high temperature. On the contrary, the braking element may preferably be made of a high melting point metal such as metal molybdenum (Mo), tungsten (W) or rhenium (Re), which has a higher temperature coefficient than the alloys such as We—Re based or other alloys mentioned above.

This type of ceramic heater also can provide high endurance without any cracking in the heating element even if it is heated to 900° C. in 3 seconds by reducing the temperature difference of 100° C. or less of the heating element circumferentially around the ceramic body 20.

In an example in FIG. 12, a connecting element 51 having relatively large area of metal film is disposed to connect effectively the fine film or filament of the braking element 5 to the heating element 4, ensuring the reliability of electrically conductive and thermally endurable connection between the different characteristic material films. A distance M, in which the connecting element is disposed, between the braking element and the heating element may be 20 mm or less, but in the case of having no connecting element, the distance nay be at least 0.2 mm.

A distance N between an rear end of the braking element 5 and a front end of the pads 8 may be adjusted to be 20 mm or more to lower the temperature of the pads to 400° C., then preventing pad metal oxidation.

In this embodiment, other elements buried in a ceramic body 20 such as inner leads are not limited to a material to be used as long as the material is thermal resistant and electrical conductive, but may preferably be made the same material as the braking to reduce manufacturing steps.

EXAMPLE 7

Ceramic green sheets were prepared of a total amount of 10% by weight of silicon oxide, calcium oxide, magnesium oxide and zirconium oxide, and the balance of aluminum oxide, and each green sheet was screen printed with on one side a W—Re-alloy-containing paste as a heating element 4 and a tungsten-metal paste as inner leads 6, and then on the opposite side with a tungsten-metal containing paste as pads 8.

The heating element 4 was patterned to make, of the paste, three folds of parallel segments each having heating length of about 5 mm and a segment width being narrower at both end portions and wider at the central portion of each segment. Samples were prepared such that the width of the narrower part in the segments at the peripheral portion was changed within a range of 60% to 100% of the width of the wider part of the segments at the central portion. The heating elements 4 of the samples were controlled to have an almost constant total resistance of about 2.4 Ω after firing.

Via holes 7 were formed through the green sheet 3, the end portions of the tungsten inner reads 6 and the respective pads 8. The via holes 7 were each filled with a conductive paste to create an electric connection between the respective inner lead and pad.

Then, the ceramic green sheet 3 was wound around a ceramic core 2 made of alumina, having a suitable length, to sealingly secure the printed heating element and inner leads to the core surface and fired at 1500 to 1600° C. to sinter the ceramic sheet and core, obtaining a ceramic heater 1.

The samples were tested to heat the heating elements by applying a voltage of 15 V wherein temperatures were measured at 8 points divided circumferentially around the ceramic body 20 to determine temperature distribution over the heating element around the ceramic heater.

For measuring temperatures, an infrared temperature distribution detector which is a "thermoviewer" under the tradename of JTG-5200 type from Nippon Denshi Datum Co. Ltd. was used to detect the rising temperature at each point, detection being repeated for all the points, to obtain the circumferential temperature distribution for each sample.

The samples were subjected to a test of 10 cycles repeating turning-on/off power at intervals of 5 seconds, followed by observation of cracks on the ceramic surface in microscopy.

The results are shown in Table 7.

TABLE 7

| Sample | Segment width at per. portion | Ratio of both widths | Temp. differ. °C. | Crack |
|---|---|---|---|---|
| 1 | 0.61 | 100 | 120 | in center |
| 2 | 0.58 | 95 | 100 | non |
| 3 | 0.549 | 90 | 50 | non |
| 4 | 0.528 | 86.8 | 30 | non |
| 5 | 0.488 | 80 | 45 | non |
| 6 | 0.458 | 75 | 100 | non |
| 7 | 0.427 | 70 | 115 | in groove |
| 8 | 0.397 | 65 | 130 | in groove |
| 9 | 0.366 | 60 | 150 | in groove |

An initial resistance: 2.4 Ω
A width of segments at a central portion; 0.61 mm

In Table 7, the samples showing circumferential temperature difference of 100° C. or less were sound, with no crack observed, even after the heating cycle test. But, cracks were observed, after the test, in the samples having higher temperature difference than 100° C. As shown in Table 7, cracks appeared in the center of the ceramic body 20 in Sample No. 1 having the peripheral segments of the same width as the central segments.

In Sample Nos. 7 to 9 in which each of the end portions of segments has narrower width than the central portion of the segments, cracks appeared on the surface of the ceramic body 20 along a space 12 or groove between the edges of the ceramic green sheet 3 which space is not covered with the pattern 40 of the heating element 4. On the contrary, Sample Nos. 2–6 having the peripheral portion having the segment width of 75 to 90% of the width of the central portion of the segment showed no crack on the ceramic body 20.

It is apparent from the experimental results that, in order to avoid cracking of ceramic heaters, it is important to reduce the difference between a maximum temperature and a minimum temperature around the ceramic body 20 over the heating element during raising temperature.

For this end, a method for homogenizing the temperature distribution is that an electric resistance per unit length in the central portion of the heating elements in the pattern is set to be lower than that in the peripheral portion thereof so that the central portion of the pattern can supply lower heat density than the peripheral portion thereof. For controlling the resistance per unit length, the widths of the segments of thin metal film making up the pattern may be adjusted to control the cross section of the corresponding segments.

EXAMPLE 8

In this Example, samples were used, which were prepared in the same manner as the Example 1, except that various angles between both edges of the pattern as shown by θ in FIG. 11 were adopted in a range of 50 to 100°. Tests were conducted by repeatedly heating 10 times the sample to 900° C. as a maximum temperature in 3 seconds to determine a temperature difference around a ceramic body 20 on the surface including a maximum temperature portion, and thereafter, the presence of cracks was observed.

The results are shown in Table 8.

TABLE 8

| sample | Angle (°) | Temper. differ. ° C. | crack |
|---|---|---|---|
| 1 | 50 | <30 | non |
| 2 | 60 | <30 | non |
| 3 | 70 | 40 | non |
| 4 | 80 | 60 | non |
| 5 | 90 | 90 | non |
| 6* | 100 | 110 | in center |

Widths of segments at a central portion and peripheral portion; 0.61 mm and 0.32 mm (52.5%), respectively.

Table 8, Sample Nos. 11 to 15 which have the angel θ of 90° or less did not suffer from cracks, with lower temperature difference than 100° C. around the ceramic body 20.

EXAMPLE 9

There were prepared samples of ceramic heaters having different length of the pattern of the heating elements in a range of 2 to 12 mm, which were made in the same manner as Example 7. Tests were conducted by repeatedly heating 10 times the sample to 900° C. as a maximum temperature in 3 seconds in a similar manner to Example 8.

The results are shown in Table 9.

TABLE 9

| Sample | heating length (mm) | Temper. differ. (° C.) | crack |
|---|---|---|---|
| 1 | 2 | 110 | in center |
| 2 | 2.5 | 80 | non |
| 3 | 4 | 60 | non |
| 4 | 6 | 50 | non |
| 5 | 8 | 30 | non |
| 6 | 10 | 30 | non |
| 7* | 12 | 30 | non |

Widths of segments at a central portion and a end portion; 0.61 mm and 0.528 mm (86.5%)

From Table 9, it is found that Sample Nos. 2 to 6 having a segment length in a range of 2.5 to 10 mm did not suffer from any crack on the ceramic body surface after the repeating heat test, with the temperature difference of 100 or less. But as for Sample No. 7, having the long pattern of 12 mm, a larger power than 80W was passed through the heating element to greatly overshoot an initial temperature.

EXAMPLE 10

Samples of ceramic heaters were prepared, which have a pattern of the heating element including a plurality of segments of metal film, each segment having a mean width of 0.61 mm in a central portion with a length range of 40% of the total length, and as the segment extends to the end portion, the segment is made narrower, the narrowest width being in a range of 40 to 100% of the width of the central portion. The narrowest portion is shown by K in FIG. 9. And, the weigh of the length range of 40% of the total length is shown by L in FIG. 9.

The samples were tested by determine temperature difference around the ceramic body 20 including a portion showing an maximum temperature when heated.

Further, tests were conducted by repeatedly heating each sample, wherein a voltage which can heat the sample to 1100° C. in 3 second is applied to the sample in varying periods of 1 to 5 seconds increasing by 1 second step, 3 times each second step, and the presence of cracks were observed after each heating. The sample having crack found on or after 3 seconds is estimated good, but the sample cracked before 3 second is to be bad.

The results are shown in Table 10.

TABLE 10

| | Segment width at per. portion | Ratio of both widths | Time until cracked | Estimation |
|---|---|---|---|---|
| 1 | 0.61 | 100 | 2 | bad |
| 2 | 0.519 | 90 | 3 | good |
| 3 | 0.427 | 80 | 5 | good |
| 4 | 0.336 | 70 | 5 | good |
| 5 | 0.244 | 60 | 4 | good |
| 6 | 0.153 | 50 | 3 | good |
| 7 | 0.122 | 40 | 2 | bad |

In Table 10, Sample No. 1 in which the width of the segments at the end portion is the same as that at the central portion suffered from a crack after 2 seconds at the first step for all samples. Sample No. 7 having the width at the end portion of 40% of that of the central portion was also cracked after 2 second at first and third steps for 2 samples. On the contrary, other samples having the end portion width in a range between 50% and 90% endured against crack to 3 seconds or more.

EXAMPLE 11

Ceramic green sheets 3 were prepared of a total amount of 10% by weight of silicon oxide, calcium oxide, magnesium oxide and zirconium oxide, and the balance of aluminum oxide, and each green sheet was screen printed with on one side a W—Re-alloy-containing paste for a heating element 4 and a tungsten-metal-containing paste for a braking element 5 and inner leads 6, and then on the opposite side with a tungsten-metal containing paste for pads 8.

The heating element 4 was patterned to make, of the paste, three folds of parallel segments each having a heating length of about 5 mm, and a segment width being narrow at both end portions, and wider at the central portion of each segment.

Samples were prepared such that the width of each segments at the end portion was 85% of the width at the central portion of the segment. For comparison, also prepared were other samples having the same width of segments from both end portions to the central portion of the segment.

The samples were modified to have different distances M between the heating segment and the braking element in a range of 3 to 25 mm. Also, some samples changed to have different resistance ratios of the heating element to the braking element in a range of 15:1 to 2:1.

Via holes 7 were formed through the green sheet 3, the end portions of the respective tungsten inner reads 6 and the respective pads 8, and each via hole 7 was filled with a conductive paste to create an electric connection between the inner lead to the pad.

Then, the ceramic green sheet 3 is wound around a ceramic core or rod 2 made of alumina, having a suitable length, to sealingly secure the printed heating element and inner leads to the rod surface and fired at 1500 to 1600° C. to sinter the ceramic sheet and core, obtaining a ceramic heater 1.

These samples were tested, using 10 samples each Sample number, to evaluate temperature rising characteristics and endurance of the ceramic heaters due to braking elements. With respect to the temperature rising characteristics, the samples were heated by supplying a power to a maximum temperature of 1000° C. to measure a time period until reaching 900° C. from room temperature. In evaluating the endurance. The samples were subjected to 5000-cycle turning-on/off heating test, with interval of 2 seconds, applying a voltage necessary to heat the ceramic heater to 1200° C. of a maximum temperature, followed by observation of cracks on the ceramic surface in microscopy and determination of resistance change before and after heating.

For measuring maximum temperatures, an infrared temperature distribution detector, such as "thermoviewer" as shown in Example 7 to detect a portion of indicating a maximum temperature on the ceramic body 20 in which portion a thermocouple of wire size of 0.1 mm was fixed to determine a behavior of the maximum temperature therein during rapid heating.

In other experiment, the samples were heated in 1 second to 3 seconds, supplying a voltage possible to heat to 900° C. in 3 seconds, then observing the presence of crack, and then the period of time where any crack appears was evaluated.

These experimental data are shown in Table 11.

TABLE 11

| Sample | Resistance ratio | width contrl. | M (mm) | appearance after heat test | rising tempr. time(s) |
|---|---|---|---|---|---|
| 1* | 15:1 | Yes | 5 | cracked | 2 |
| 2 | 10:1 | Yes | 5 | clean | 3 |
| 3 | 5:1 | Yes | 5 | clean | 5 |
| 4 | 2:1 | Yes | 5 | cracked | 4 |
| 5* | 1:1 | Yes | 5 | clean | 2 |
| 6* | 15:1 | No | 5 | clean | 2 |
| 7 | 10:1 | No | 5 | cracked | 3 |
| 8 | 5:1 | No | 5 | cracked | 4 |
| 9 | 2:1 | No | 5 | clean | 3 |
| 10* | 1:1 | No | 5 | cracked | 2 |
| 11 | 5:1 | Yes | 3 | clean | 3 |
| 12 | 5:1 | Yes | 10 | clean | 3 |
| 13 | 5:1 | Yes | 15 | clean | 3 |
| 14 | 5:1 | Yes | 20 | clean | 3 |
| 15* | 5:1 | Yes | 25 | cracked | 3 |
| 16* | 5:1 | Yes | — | cracked | 2 |

In Table 11, Samples having a resistance ratio of the heating element 4 to the braking element 5 being in a range of 1.5 to 10.0, and a length of the braking element 5 being 20 mm or less are excellent in heat resistance without any crack appearing, and in endurance of low resistance change.

FIG. 18 shows the temperature change, in the process of the heating test, from room temperature to a stable, saturated temperature, wherein a curve (A) shows a temperature behavior on the ceramic surface over the heating element 4 of Sample No. 16 shown in Table 11, without using a braking element, the saturated temperature being over 1000° C. under this condition. Curves (B) and (C) shows the temperature changes of the surface over the heating element 5 and over the braking element 5, respectively, of Sample No. 10 shown in Table 11. The curve (B) of the ceramic heater 4 having a braking element shows a saturated temperature of about 940° C. around the heating element, and the curve (C) shows the saturated temperature about 810° C. around the braking element.

It is recognized that the brazing element in the ceramic heater has an effect of relatively lowering the saturated temperature of the ceramic heater while improving the high temperature rising speed at almost the same speed as the usual ceramic heaters having no braking element, then enhancing endurance of the ceramic heater, and further omitting provision of any power supply controller for avoiding temperature overshoot.

Embodiment 3

This embodiment deals with improvement of the brazing portion including the pads 8, braze layers 9 and outer leads 10 disposed on the outside of the ceramic heaters. As described previously in the Embodiments 1 and 2, the ceramic heaters are fired from the ceramic green sheet 3, a patterned heating member 60 including a heating element 4 on the surface of thereof and a ceramic core 2 or plate 30 to be wound or covered with the ceramic green sheet 3.

The ceramic heaters 1 have pads 8, made of tungsten or molybdenum, plated with nickel or chromium to form a plated layer 11 which is brazed to the outer leads 10 10 with a brazing material such as a Au—Cu based alloy or a Au—Ni based alloy, to connect to the pad 8 through the plated layer 11, as shown in FIGS. 1 and 2.

Further, the braze layers 9 over the pads 8 are also plated with the same plating material to form a second plated layer 110, as shown in FIG. 2, to cover the outer leads 10 as well as the braze layer 9. Next, the ceramic heater having the layer 110 is subjected to heat treatment at 600 to 1000° C. in a reducing atmosphere, to complete a ceramic heater with outer leads 10.

In the above step of heat treating the ceramic heater, preferably, chlorine may be removed form the plated layer into an amount of 2000 counts of chlorine by measuring chlorine in EPMA analysis.

Such a lowered chlorine level on the plated layers can realize a high corrosion resistance and than enhance endurance of the ceramic heater.

In generally, if much chlorine is present around the brazing portion, such chlorine would lead to corrosion, as will be explained. Residual chlorine on the surface acts to nickel leads or nickel-containing brazing material to form nickel chloride on the leads or brazing material, and when humidity in the ambient air exceeds critical humidity individual in nickel chloride at the current temperature, the nickel chloride absorbs the moisture to condense water therearound, and then, is dissociated into chlorine ions in the water.

Further, nickel contained in the metal or alloy making up the outer leads 10 or braze layer 9 is dissolved in the chlorine-containing solution by a reaction (1)

$$Ni+2Cl^- \rightarrow Ni^{2+}+2e^-+2Cl^- \qquad (1)$$

The electrons appearing from this reaction may react to oxygen dissolved in the solution to form hydroxide ions, as represented by a reaction (2) below:

$$\tfrac{1}{2}O_2+H_2O+2e^- \rightarrow 2OH^- \qquad (2)$$

Further, in heating the ceramic heater, the hydroxide ions react to the Ni ions mentioned above to form nickel hydroxide, and, while heating, to nickel oxide as shown in the following equations (3) and (4):

$$Ni^{2+}+2OH^- \rightarrow Ni(OH)_2 \qquad (3),$$

and $$Ni(OH)_2 \rightarrow NiO + H_2O \qquad (4)$$

These reactions are repeated for a relatively long period of time during using the ceramic heater, resulting in corroding surfaces of the nickel metal or its alloys in the form of pitting corrosion.

In this embodiment, chlorine can be effectively removed from the brazing portion on the ceramic body 20 so that the ceramic heater can have sufficiently high endurance for a long time in a high humidity circumstances.

EXAMPLE 12

Samples of ceramic heaters (having outer leads 10 and the second plated layer 110 thereon ??) were immersed into an aqueous solution containing different contents of $NiCl_2$ to vary a concentration of absorbed chlorine (Samples A to E). Thereafter, the samples were used under some circumference to test a reduction rate, after heating, of electric resistance of the heating element as a measure of reducing endurance of ceramic heaters.

n upper limit of tolerated chlorine counts was determined from the chlorine count absorbed in the ceramic heaters showing the resistance reduction ratio of 3% or less. The test was conducted under the conditions as listed as follows.

The Sample was immersed into solutions containing 5 to 40% of $NiCl_2$ and dried. The samples were kept for 5000 hours in air at room temperature with 50% relative moisture.

Chlorine absorbed was determined by EPMA (Electron Probe Microanalysis) measuring the outer leads 10 and braze layer 9 of the samples. For EPMA, a wavelength dispersive analyzer (JXA-8600M analyzer made by Japan Electron, Co. Ltd.) was used under conditions of voltage 15 kV, a current of $3\times10^{-7}$ A and an analyzed spot area of 50 μm square, with data sampling time of 0.5 sec per spot.

The experimental results are shown in Table 12.

TABLE 12

| Sample | Amount of Chlorine (count) | Resistance change (%) | Estimation |
| --- | --- | --- | --- |
| A | 1090 | 0 | good |
| B | 2000 | 3.0 | good |
| C | 2100 | 3.2 | good |
| D | 10059 | 20.5 | good |
| E | 23280 | infinite | bad |

In this Table 12, it is found that the limit of residual chlorine on the nickel or its alloy surface may be set to be 2000 counts of chlorine measured by EPMA to restrain the resistance of the ceramic heater changes of 3.0% or less after the repeating heat test.

EXAMPLE 13

In this example, as samples, ceramic heaters were immersed into a solution of 40% of $NiCl_2$ to absorb chlorine thereon, and dried. The Samples were placed in a reducing-atmospheric furnace which contains an ammonia-dissolved gas, wherein the furnace temperature was varied from 400° C. to 600° C. The samples were each withdrawn from the furnace each ime that the furnace temperature reached some predetermined stepping value, and from each sample, the chlorine count was analyzed by EPMA in the same conditions as mentioned previously in Example 12.

The results are shown in Table 13.

TABLE 13

| Sample | Amount of Chlorine after solution (count) | Furnace temperature (° C.) | Amount of Chlorine after heating (count) | Estimation |
|---|---|---|---|---|
| A | 19849 | 400 | 17005 | bad |
| B | 19712 | 150 | 8690 | bad |
| C | 20068 | 500 | 1910 | good |
| D | 20980 | 550 | 903 | good |
| E | 19970 | 600 | 238 | good |

It is found that from Table 13 that the chlorine content under 2000 counts by EPMA can be obtained by heat treating ceramic heaters at a temperature of 500° C. or more.

What is claimed is:

1. A ceramic heater comprising: a ceramic body; a heating member buried in the ceramic body; and pads disposed on the outside of the ceramic body and electrically connected to the heating member, wherein an outer lead is joined by a braze layer onto a metal plated layer covering each of the pads, and the braze layer contains an amount of 500 ppm or less by weight of palladium, and wherein the outer leads are formed of nickel ar an alloy thereof, and have a mean crystal grain size of 400 µm or less.

2. The ceramic heater according to claim 1, wherein the plated layer is formed on the surface of the metal pads which have been activated with an activating solution containing an amount of 90 ppm or less by weight of Palladium.

3. The ceramic heater according to claim 1, wherein the braze layer does not have any activity.

4. The ceramic heater according to claim 1, wherein the braze layer comprises a metal or an alloy based on gold, copper, or nickel.

5. The ceramic heater according to claim 1, wherein any edge of the braze layer secured within a area of and on the pad is in a minimum distance D of 0.02 mm or more inside from the adjacent edge of the pad.

6. The ceramic heater according to claim 1, wherein via holes are each formed in the ceramic body to connect the heating member to the respective pads, and any edges of the braze layers secured on the pads is each in a minimum distance of 0.2 mm or more apart from the respective via holes.

7. A ceramic heater comprising: a ceramic body; heating member buried in the ceramic body; and pads disposed on the outside of the ceramic body and electrically connected to the heating member, wherein an outer lead is joined by a braze layer onto a metal plated layer covering each of the pads, and the braze layer contains an amount of 500 ppm or less by weight of palladium, and wherein the heating member includes a heating element containing a plurality of segments disposed in series made of tungsten, molybdenum, or rhenium or an alloy thereof, and any of the segments of the heating element has a notch of a width G of ½ or less of the width of F of the segment adjacent of the notch.

8. A ceramic heater sintered of a ceramic core, a ceramic sheet surrounded integrally onto the round ceramic core, and a heating member disposed integrally between the round ceramic core and the ceramic sheet, wherein the heating element contains a plurality of segments disposed in series to make a pattern made of tungsten, molybdenum, or rhenium or an alloy thereof, and an electric resistance per unit length of the segment at a central portion of the heating element is in a range of 75% to 90% of that of a segment at the peripheral portion thereof, and wherein a braking element having a higher temperature coefficient of electric resistance than that of the resistance of the segment is connected to the heating member in a series, a resistance ratio of the heating member to the braking element is in a range of 1.5 to 10.0, and a length of the braking element is 20 mm or less.

9. The ceramic heater according to claim 8, wherein an end of the braking element is connected to pads via inner leads and a distance of the end of the braking element to the pad is 20 mm or more.

* * * * *